United States Patent
Goto et al.

(10) Patent No.: US 9,158,041 B2
(45) Date of Patent: Oct. 13, 2015

(54) OPTICAL SHEET, SURFACE LIGHT SOURCE DEVICE, AND TRANSMISSION DISPLAY DEVICE

(75) Inventors: Masahiro Goto, Mihara (JP); Daijiro Kodama, Mihara (JP); Junichi Sawanobori, Minami Alps (JP); Akiko Goto, Kuki (JP); Hiroshi Yamamoto, Kawaguchi (JP); Wataru Tokuhara, Okazaki (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 1056 days.

(21) Appl. No.: 12/523,908

(22) PCT Filed: Feb. 1, 2008

(86) PCT No.: PCT/JP2008/051620
§ 371 (c)(1),
(2), (4) Date: Jul. 21, 2009

(87) PCT Pub. No.: WO2008/093819
PCT Pub. Date: Aug. 7, 2008

(65) Prior Publication Data
US 2010/0246161 A1    Sep. 30, 2010

(30) Foreign Application Priority Data
Feb. 2, 2007    (JP) .................................. 2007-024701

(51) Int. Cl.
*G02B 3/00* (2006.01)
*G02B 5/02* (2006.01)
(Continued)

(52) U.S. Cl.
CPC ............ *G02B 3/0062* (2013.01); *G02B 5/0215* (2013.01); *G02B 5/0226* (2013.01);
(Continued)

(58) Field of Classification Search
CPC .. G02B 3/0062; G02B 5/0215; G02B 5/0226; G02B 5/0231; G02B 5/0278; G02F 2001/133607

USPC .................................................. 362/618–620
See application file for complete search history.

(56) References Cited

U.S. PATENT DOCUMENTS 5,196,960 A    3/1993 Matsuzaki et al.
5,402,324 A *  3/1995 Yokoyama et al. ............. 362/19
(Continued)

FOREIGN PATENT DOCUMENTS

CN    1834755 A1    9/2006
JP    05-061120 A1   3/1993
(Continued)

OTHER PUBLICATIONS

Japanese Office Action dated Dec. 14, 2012 (with English translation).
(Continued)

*Primary Examiner* — Robert May
(74) *Attorney, Agent, or Firm* — Burr & Brown, PLLC

(57) ABSTRACT

An optical sheet is incorporated in a direct type surface light source device including a light source and is configured to allow light emitted from the light source to exit after changing a travel direction of the light. The optical sheet has a light exiting side lens part including unit lenses juxtaposed to one another and each unit lens is convex toward a light exiting side. A light scattering layer, configured to scatter the light, is provided to each unit lens. The light scattering layer extends along a light exiting side surface of each convex unit lens and constitutes the light exiting side surface of the unit lens. A thickness of the light scattering layer around an apex portion of each unit lens is greater than the thickness of the light scattering layer around each end portion of the unit lens.

22 Claims, 17 Drawing Sheets

(51) Int. Cl.
*G02F 1/1335* (2006.01)
*G02B 5/04* (2006.01)

(52) U.S. Cl.
CPC ............ *G02B5/0231* (2013.01); *G02B 5/0242* (2013.01); *G02B 5/0278* (2013.01); *G02F 1/133604* (2013.01); *G02B 5/045* (2013.01); *G02F 2001/133607* (2013.01)

(56) References Cited

U.S. PATENT DOCUMENTS

| | | |
|---|---|---|
| 7,883,254 B2 * | 2/2011 | Kinoshita et al. ............. 362/615 |
| 2005/0243551 A1 | 11/2005 | Onishi et al. |
| 2005/0270654 A1 | 12/2005 | Goto et al. |
| 2006/0227323 A1 * | 10/2006 | Goto ............................. 356/336 |
| 2007/0127265 A1 | 6/2007 | Onishi et al. |
| 2007/0189038 A1 * | 8/2007 | Pokorny et al. ............... 362/615 |

FOREIGN PATENT DOCUMENTS

| | | |
|---|---|---|
| JP | 2006-140124 A1 | 6/2006 |
| JP | 2006-259125 A1 | 9/2006 |
| JP | 2006-317747 A1 | 11/2006 |
| JP | 2007-225741 A1 | 9/2007 |
| TW | M274545 | 9/2005 |
| TW | 200613844 A | 5/2006 |
| WO | WO 2006013969 A1 * | 2/2006 |
| WO | 2007/004573 A1 | 1/2007 |

OTHER PUBLICATIONS

Taiwanese Office Action dated Oct. 8, 2012 (with English translation).

* cited by examiner

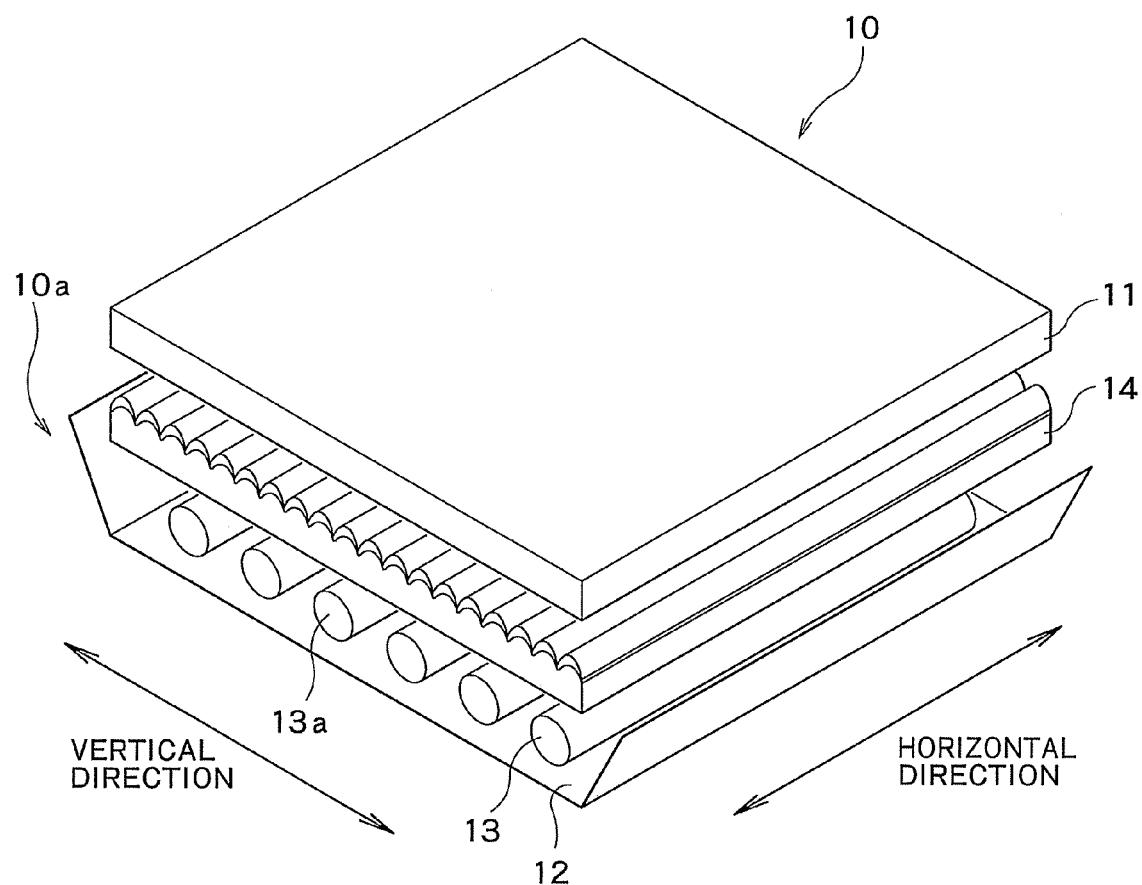
F I G. 1

OPTICAL SHEET, SURFACE LIGHT SOURCE DEVICE, AND TRANSMISSION DISPLAY DEVICE

FIELD OF THE INVENTION

The present invention relates to an optical sheet, an optical member and a surface light source device, for use in illumination for a liquid crystal display device or the like, as well as to a transmission display device using such components.

BACKGROUND OF THE INVENTION

As a surface light source device (or back light device) for illuminating a display unit of a transmission type (e.g., a liquid crystal display panel) from its back side, devices of various types have been proposed and put to practical use. The surface light source that has been widely spread is classified into an edge light type and a direct type commonly based on a system of a type for converting a light source which is not the surface light source into the surface light source. For instance, in the surface light source of the direct type, the light source is arranged to be opposed to the transmission display unit. In this case, an appropriate distance is provided between emission members (or emission tubes) of the light source and the transmission display unit. In addition, light diffusing panels, light converging sheets (light collecting sheets) or the like optical sheets are provided in large numbers between the emission members and the transmission display unit.

However, while using so many optical sheets, such a conventional system cannot sufficiently condense the light emitted from the light source toward a front direction (or normal direction relative to the optical sheets). Therefore, the transmission display unit (or LCD panel) has been improved so as not to deteriorate the definition even in the case of the light that comes in an oblique direction.

However, in the case of improving or modifying the transmission display unit, the construction of the LCD panel becomes considerably complicated, leading to a rise in the production cost as well as to deterioration of efficiency of utilizing the light. Especially, in the direct type surface light source device, unevenness of light intensity or luminance (or luminance unevenness) may tend to be seen due to a difference between a portion adjacent to each emission member and a portion not adjacent to the emission member (or difference between a portion immediately above one of the emission member and a portion immediately above a middle point between two emission members positioned next to each other). As a result, in some cases, an image of each emission member (or light image) is likely to be visually confirmed. Such inconvenience can be avoided or dissolved by providing a relatively large distance between the emission members and the LCD panel. However, such a method would lead to another problem that the thickness of the display should be unduly increased. Alternatively, if attempting to suppress such luminance unevenness by increasing an extent of light diffusion and/or by restricting a transmission amount of light, the efficiency of utilizing the light would be substantially deteriorated.

JP2006-259125A discloses a technique for providing a light scattering layer along a surface convex shape of each unit lens in an optical sheet having convex unit lenses provided on a light exiting side of the optical sheet. In the optical sheet disclosed in JP2006-259125A, it is intended to reduce the luminance unevenness by providing the light scattering layer having substantially the same thickness along the surface convex shape of each unit lens. However, in some cases, an effect of reducing the luminance unevenness can not be sufficiently obtained, depending on conditions of the light source and the like, only by employing the technique described in JP2006-259125A.

SUMMARY OF THE INVENTION

The present invention was made in light of such circumstances, and therefore it is an object of this invention to provide an optical sheet, an optical member, a surface light source device and a transmission display device, which can effectively reduce the luminance unevenness.

The present invention provides the optical sheet, which is incorporated in a direct type surface light source device including a light source and is configured to allow light emitted from the light source to exit after changing a travel direction of the light, the optical sheet comprising: a light exiting side lens part including unit lenses juxtaposed to one another, each unit lens projecting toward a light exiting side, wherein a light scattering layer configured to scatter the light is provided to each unit lens, wherein the light scattering layer extends along a light exiting side surface of each projected unit lens and constitutes the light exiting side surface of the unit lens, and wherein a thickness of the light scattering layer around an apex portion of each unit lens is greater than the thickness of the light scattering layer around each end portion of the unit lens.

According to the optical sheet of this invention, an unduly rise of the luminance measured in a position near the light source can be suppressed, as well as an unduly drop of the luminance measured in a position spaced away from the light source can be suppressed. As such, the luminance unevenness can be significantly reduced.

In addition, in the optical sheet of this invention, the thickness of the light scattering layer around the apex portion of each unit lens may be $1/3$ or greater of an arrangement pitch of the unit lenses. According to the optical sheet of this invention, the luminance unevenness attributable to arrangement and/or configuration of the light source can be effectively dissolved, as well as a light condensing effect (light collecting effect) of the optical sheet can be significantly enhanced. In addition, this optical sheet can be produced by multi-layer extrusion, as such providing excellent productivity.

In addition, in the optical sheet of this invention, each unit lens may have a shape corresponding to a part of an elliptic column having a section of an ellipse or may have a shape corresponding to a part of a spheroid having a section of an ellipse, with a major axis of the sectional ellipse extending along a normal direction relative to a sheet surface. According to the optical sheet of this invention, the light condensing effect (light collecting effect) of the optical sheet can be controlled more adequately, as compared with the case in which each unit lens has a shape corresponding to a part of a circular cylinder or shape corresponding to a part of a sphere.

In addition, in the optical sheet of this invention, the thickness of the light scattering layer may be gradually reduced as one moves from the apex portion of each unit lens toward the end portion of the unit lens.

In addition, in the optical sheet of this invention, the light scattering layer may be provided so as to constitute only a part of the light exiting side surface of each unit lens.

In addition, in the optical sheet of this invention, the light scattering layer may be provided so as to constitute only a part of the light exiting side surface of each unit lens, and the thickness of the light scattering layer may be gradually reduced as one moves away from the apex portion of the unit lens.

This invention also provides a first surface light source device for illuminating a transmission display unit from a back side, the surface light source comprising: a light source configured to emit illumination light; and either one of the optical sheets described above.

In addition, in the first surface light source device of this invention, when the light source includes emission members arranged with a space of a distance d, and when the optical sheet is located in a position spaced a distance s away from the emission members, the following relation may be established:

$$L2 \times 1.2 \leq L1 \leq L2 \times 2.0,$$

in which, L1 is a length of an optical path defined through the light scattering layer when light enters into the optical sheet from one of the emission members along the normal direction relative to the sheet surface of the optical sheet and then exits from the optical sheet along the normal direction relative to the sheet surface of the optical sheet, and L2 is a length of another optical path defined through the light scattering layer when the light enters into the optical sheet from the one of the emission members at an angle θ (θ=arctan (d/s)) and then exits from the optical sheet along the normal direction relative to the sheet surface of the optical sheet. This first surface light source device according to the present invention can avoid or prevent the luminance in each position near the light source from being unduly high as well as prevent the luminance in each position near each middle point between two adjacent emission members of the light source from being unduly reduced. As such, the luminance unevenness can be effectively reduced.

In addition, in the first surface light source device of this invention, a direction of an optical path that is mainly controlled by the optical sheet may be an up and down direction relative to a display surface of the transmission display part in use. In other wards, the optical sheet may mainly control an optical path with respect to an up and down direction of a display surface of the transmission display unit in use. According to the first surface light source device of this invention, the light exiting from the transmission display unit while spreading with respect to the vertical direction can be condensed more effectively. This can provide a display device having a wider horizontal viewing angular range relative to a vertical viewing angular range. Such a display device is now commonly considered in this field as an ideal one.

In addition, in the first surface light source device of this invention, two optical sheets of those described above may be provided, wherein a direction of an optical path that is mainly controlled by one of the two optical sheets and a direction of an optical path that may be mainly controlled by the other of the two optical sheets are perpendicular to each other. According to the first surface light source device of this invention, light condensation (light collection) in two different directions can be controlled independently.

In addition, in the first surface light source device of this invention, the light source may include emission members each extending linearly in one direction, the emission members being arranged in a direction perpendicular to the one direction in which each emission member extends, wherein each unit lens of the optical sheet may extend while maintaining substantially the same sectional shape in a direction parallel to the sheet surface, and wherein the direction in which each unit lens extends may be parallel to the direction in which each linear emission member extends. Such a first surface light source device of this invention can provide configuration that can effectively reduce the luminance unevenness attributable to arrangement in which the linear emission members are arranged in a direction. As such, the luminance unevenness can be reduced more effectively.

In addition, in the first surface light source device of this invention, the light source may include point-like emission members arranged in two different directions. According to the first surface light source device of this invention, the luminance unevenness can be effectively reduced, especially in the case in which the light source including, for example, LEDs (Light Emitting Diodes) as the emission members, is used. In this case, it is desirable to control the optical path, for example, with respect to two directions perpendicular to each other, corresponding to the arrangement of the LEDs. More specifically, it is desirable to arrange a plurality of optical sheets such that the optical path can be controlled with respect to the two directions perpendicular to each other, as well as or otherwise to use the optical sheets including unit lenses each composed of a part of a spheroid having the major axis perpendicular to the sheet surface.

This invention also provides a first transmission display device comprising the transmission display unit and either one of the first surface light source devices described above.

In addition, this invention provides the optical member incorporated in a surface light source device including a light source, the optical member comprising: a first optical sheet including a light exiting side lens part having unit lenses juxtaposed to one another and each unit lens projecting toward a light exiting side; and a second optical sheet including a prism part having unit prisms juxtaposed to one another, wherein a light scattering layer configured to scatter light is provided to each unit lens, wherein the light scattering layer extends along an light exiting side surface of each projected unit lens and constitutes the light exiting side surface of the unit lens, wherein a thickness of the light scattering layer around an apex portion of each unit lens is greater than the thickness of the light scattering layer around each end portion of the unit lens, and wherein each unit prism includes an apex point, in a section taken along an arrangement direction of the unit prisms.

In addition, in the optical member according to this invention, the second optical sheet may be located on the light exiting side relative to the first optical sheet, wherein each unit prism may project toward the light exiting side, and wherein the arrangement direction of the unit prisms and an arrangement direction of the unit lenses may be parallel to each other.

In addition, in the optical member according to this invention, the second optical sheet may be located on the light exiting side relative to the first optical sheet, wherein each unit prism may project toward the light exiting side, and wherein the arrangement direction of the unit prisms and an arrangement direction of the unit lenses may be perpendicular to each other.

In addition, in the optical member according to this invention, the second optical sheet may be located on the light exiting side relative to the first optical sheet, wherein each unit prism may project toward a side opposite to the light exiting side, and wherein the arrangement direction of the unit prisms and an arrangement direction of the unit lenses may be parallel to each other.

In addition, in the optical member according to this invention, the second optical sheet may be located on the light exiting side relative to the first optical sheet, wherein each unit prism may project toward a side opposite to the light exiting side, and wherein the arrangement direction of the unit prisms and an arrangement direction of the unit lenses may be perpendicular to each other.

In addition, in the optical member according to this invention, the first optical sheet may be located on the light exiting side relative to the second optical sheet, wherein each unit prism may project toward the light exiting side, and wherein the arrangement direction of the unit prisms and an arrangement direction of the unit lenses may be parallel to each other.

In addition, in the optical member according to this invention, the first optical sheet may be located on the light exiting side relative to the second optical sheet, wherein each unit prism may project toward the light exiting side, and wherein the arrangement direction of the unit prisms and an arrangement direction of the unit lenses may be perpendicular to each other.

In addition, in the optical member according to this invention, the first optical sheet may be located on the light exiting side relative to the second optical sheet, wherein each unit prism may project toward a side opposite to the light exiting side, and wherein the arrangement direction of the unit prisms and an arrangement direction of the unit lenses may be parallel to each other.

In addition, in the optical member according to this invention, the first optical sheet may be located on the light exiting side relative to the second optical sheet, wherein each unit prism may project toward a side opposite to the light exiting side, and wherein the arrangement direction of the unit prisms and an arrangement direction of the unit lenses may be perpendicular to each other.

In addition, the optical member according to this invention may further comprise an adhesive layer located between the first optical sheet and the second optical sheet. In addition, in the optical member of this invention, at least one of the apex portion of each unit lens of the light exiting side lens part and an apex portion of each unit prism of the prism part may be stuck into the adhesive layer, so that the first optical sheet and the second optical sheet can be fixed in position via the adhesive layer.

In addition, in the first optical sheet of the optical member of this invention, the thickness of the light scattering layer around the apex portion of each unit lens may be ⅓ or greater of an arrangement pitch of the unit lenses.

In addition, in the first optical sheet of the optical member of this invention, each unit lens may have a shape corresponding to a part of an elliptic column having a section of an ellipse or may have a shape corresponding to a part of a spheroid having a section of an ellipse, with a major axis of the sectional ellipse extending along a normal direction relative to a sheet surface.

In addition, in the first optical sheet of the optical member of this invention, the thickness of the light scattering layer may be gradually reduced as one moves from the apex portion of each unit lens toward the end portion of the unit lens.

In addition, in the first optical sheet of the optical sheet of this invention, the light scattering layer may be provided so as to constitute only a part of the light exiting side surface of each unit lens.

In addition, in the first optical sheet of the optical member of this invention, the light scattering layer may be provided so as to constitute only a part of the light exiting side surface of each unit lens, and the thickness of the light scattering layer may be gradually reduced as one moves away from the apex portion of the unit lens.

This invention also provides a second surface light source device for illuminating a transmission display unit from a back side, the second surface light source device comprising: a light source configured to emit illumination light; and either one of the optical sheets described above.

In the second surface light source device of this invention, when the light source includes emission members arranged with a space of a distance d, and when the optical sheet is located in a position spaced a distance s away from the emission members, the following relation may be established:

$$L2 \times 1.2 \leq L2 \leq L2 \times 2.0,$$

in which, $L1$ is a length of an optical path defined through the light scattering layer when light enters into the optical sheet from one of the emission members along the normal direction relative to the sheet surface of the optical sheet and then exits from the optical sheet along the normal direction relative to the sheet surface of the optical sheet, and $L2$ is a length of another optical path defined through the light scattering layer when the light enters into the optical sheet from the one of the emission members at an angle $\theta$ ($\theta = \arctan(d/s)$) and then exits from the optical sheet along the normal direction relative to the sheet surface of the optical sheet.

The second surface light source device according to this invention may further comprise a polarized light separation film located on the light exiting side of the optical member.

This invention also provides a second transmission display device comprising the transmission display unit and either one of the second surface light source devices described above.

BRIEF DESCRIPTION OF DRAWINGS

FIG. 1 is a diagram for explaining a first embodiment of the present invention, the diagram being a perspective view showing a transmission display device and a surface light source device.

DETAILED DESCRIPTION OF THE INVENTION

Figure 2:
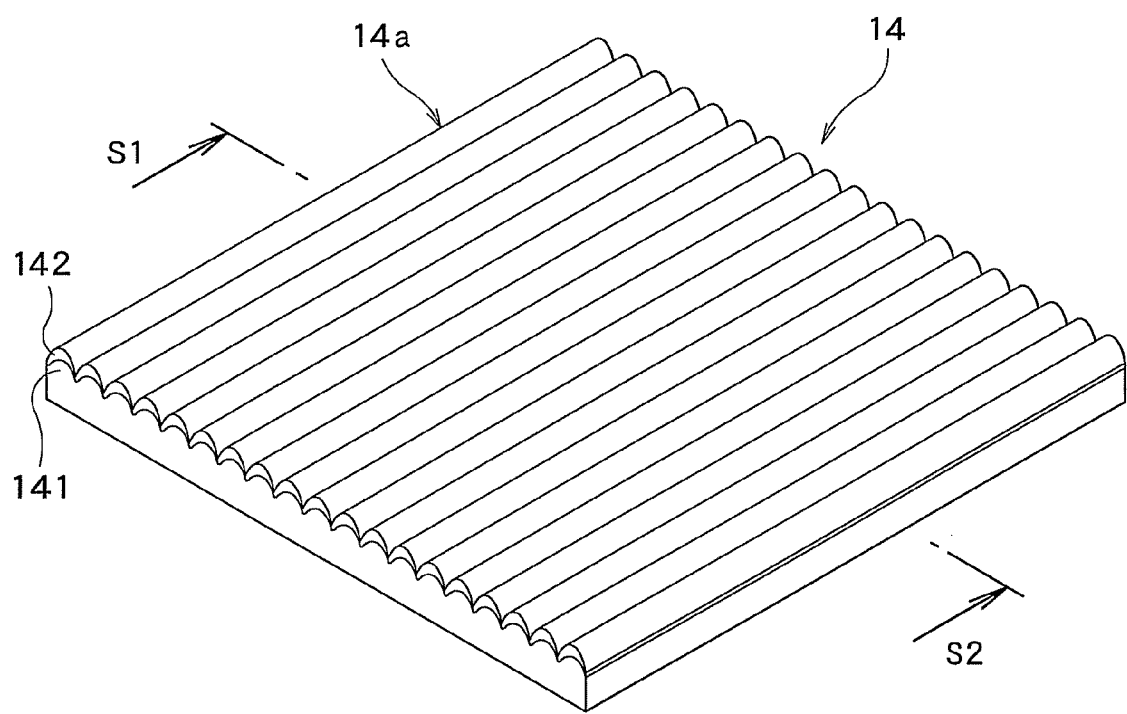
FIG. 2 is a perspective view showing an optical sheet incorporated in the surface light source device shown in FIG. 1.

Hereinafter, one embodiment of the present invention will be described with reference to the drawings. According to the embodiment that will be described below, a primary challenge to significantly reduce the luminance unevenness and provide substantially uniform illumination can be achieved, without increasing the number of optical sheets. In the attached drawings, for better understanding and clarity, proper alteration and exaggeration from real things, in scales, ratios of horizontal and vertical dimensions or the like, are utilized. In addition, while specific numerical values, shapes, materials and the like will be mentioned below, they may be altered and/or modified properly.

First Embodiment

FIG. 1 is a diagram for illustrating a first embodiment of a transmission display device employing the optical sheet according to the present invention. A transmission display device 10 of this embodiment includes an LCD panel 11, a reflector 12, a light source 13 and an optical sheet 14. In this case, a surface light source device 10a is composed of the reflector 12, emission tubes 13a and optical sheet 14. In such construction, when the surface light source 10a illuminates the LCD panel 11 from a back side of the LCD panel 11, image information will be displayed on the LCD panel 11.

The light source 13 includes a plurality of linear emission members (or linear emission tubes) 13a, and each of the emission members is composed of a cold-cathode tube. For instance, eighteen emission members 13a, which collectively constitute the light source 13, are arranged with an equal interval of approximately 20 mm. The light source 13 is arranged such that a longitudinal direction of each emission tube 13a extends along a horizontal direction while an arrangement direction of the emission tube 13a (a direction in which the plurality of linear emission members are arranged) extends along a vertical direction of the lens part 14a. The LCD panel 11 is a transmission display unit composed of a liquid crystal display device of the transmission type. As one example, the LCD panel can be designed to have a display surface sized with a diagonal line length of 32 inches (740 mm×420 mm). Typically, the LCD panel 11 is of a widescreen type. In addition, the LCD panel 11 can be configured to display images with 1280-by-768 resolution. The reflector 12 is provided on a back side of the emission tubes 13a. The reflector 12 is designed to approximately uniform illuminance of light entering into each position of the display surface. Furthermore, the optical sheet 14 is provided between the light source 13 and the LCD panel 11. For instance, a center of the light source 13 and the optical sheet 14 are spaced with a 20 mm distance from each other along the normal direction relative to a sheet surface of the optical sheet 14.

FIG. 2 is a perspective view showing the optical sheet 14. The optical sheet 14 is adapted for condensing or collecting light coming out from the emission members 13a of the light source 13 by changing a travel direction of the light into (toward) the front direction. The light collected (condensed) by the optical sheet 14 will exhibit a smooth slope or smooth gradient of luminance distribution in a predetermined angular range including the front direction. In addition, the optical sheet 14 is configured to uniform the in-plane luminance distribution. As used herein, the front direction means a direction parallel with the normal direction relative to the sheet surface of the optical sheet 14.

The optical sheet 14 includes a light exiting side lens part 14a constituting a surface on a light exiting side. The light exiting side lens part 14a includes a plurality of unit lenses 141 juxtaposed to one another and each being convex toward the light exiting side. In a certain range of each unit lens 141, a light scattering layer 142 having a function of scattering the light is provided along a surface shape of the unit lens 141.

In the light exiting side lens part 14a of the optical sheet 14 of this embodiment, the plurality of unit lenses 141 are arranged in one direction, with each unit lens 141 extending linearly in the other direction perpendicular to the one direction (or arrangement direction). Each unit lens 141 has a shape corresponding to a part of an elliptic column. More specifically, in a section taken along the arrangement direction of the unit lenses 141, the unit lens has a shape corresponding to a part of ellipse, with a major axis thereof extending along the normal line relative to the surface of the optical sheet 14. In addition, the arrangement direction of the unit lenses 141 in the light exiting side lens part 14a is parallel with the arrangement direction of the emission members 13a of the light source 13 (see FIG. 1). The term "sheet plane" herein used refers to a plane which extends along a plane containing an intended member in sheet form when the intended member is observed as a whole.

Figure 3:
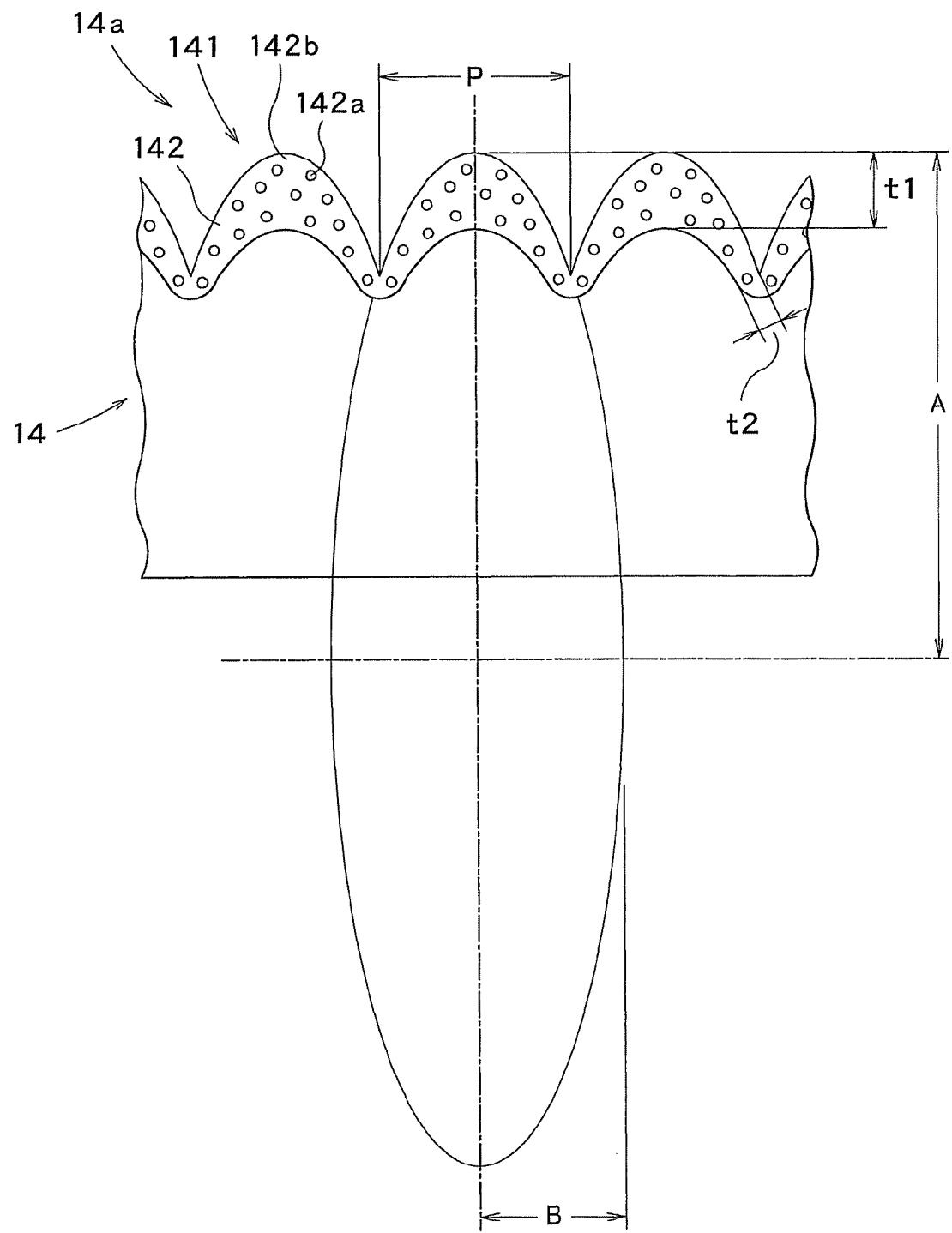
FIG. 3 is a diagram showing a section taken along line S1-S2 in FIG. 2.

FIG. 3 is a section of the optical sheet 14 taken along line S1-S2 shown by arrows in FIG. 2. In a sectional shape, as shown in FIG. 3, of each unit lens 141 constituting the light exiting side lens part 14a, a semi-major axis A of the sectional elliptic shape may be set at 0.8 mm, while a semi-minor axis B of the sectional elliptic shape may be set at 0.23 mm. In one example shown in the drawing, an arrangement pitch P of each unit lens 141 may be 0.3 mm. Additionally, in this example, a thickness of the optical sheet 14 may be 0.7 mm. A portion of the optical sheet 14, except for the light scattering layer 142 that will be described later, may be formed from, for example, a transparent MS (methacryl styrene: a copolymer of an acryl resin and a styrene resin) material having a refractive index of 1.53.

In the surface of each unit lens 141 on an observer side (or light exiting side), the light scattering layer 142 is provided to the unit lens 141 along the convex shape thereof. Namely, the light scattering layer 142 extends along an light exiting side surface of each convex unit lens 141, so as to cover and constitute the light exiting side surface of the unit lens 141. A thickness t1 of the light scattering layer 142 around an apex portion of each unit lens 141 is greater than a thickness t2 of the light scattering layer 142 around each end portion (or portion forming a valley portion together with each adjacent unit lens) of the unit lens 141. As one example, in the shown light scattering layer 142, the thickness t1 of the layer around the apex portion of each unit lens 141 may be set at 0.12 mm, while the thickness t2 of the layer around each valley portion of the unit lens 141 may be set at 0.08 mm. It should be noted that the thickness of the light scattering layer 142 will vary with a direction in which it is measured, because the surface of each unit lens 141 is a curved surface. However, as shown and described herein, the thickness of each unit lens 141 is defined as one measured along an imaginary straight line perpendicular to the surface of the unit lens 141 at each point to be measured.

In this embodiment, the light scattering layer 142 includes a base material 142b and light scattering particles 142a dispersed in the base material 142b. The base material 142b may be formed from the same material as the portion except for the light scattering layer 142 of each unit lens 141, or otherwise may be formed from a different material from the portion except for the light scattering layer 142 of each unit lens 141. As one example, the base material 142b is formed from the MS material having a refractive index of 1.53. As the light scattering particles 142a, acryl beads having a refractive index of 1.49 (i.e., a difference in the refractive index from the base material (i.e., the MS material having the refractive index of 1.53) of the light scattering layer 142 is 0.04) and an average particle size (φ) of 5 μm can be used. For instance, the scattering layer 142 may be formed by mixing 5 parts by weight of the acryl beads used as the light scattering particles 142a with 100 parts by weight of the base material 142b. In addition, such a light scattering layer 142 may be formed integrally with the portion except for the light scattering layer 142 of each unit lens 141, such as by two-layer extrusion.

Figure 4:
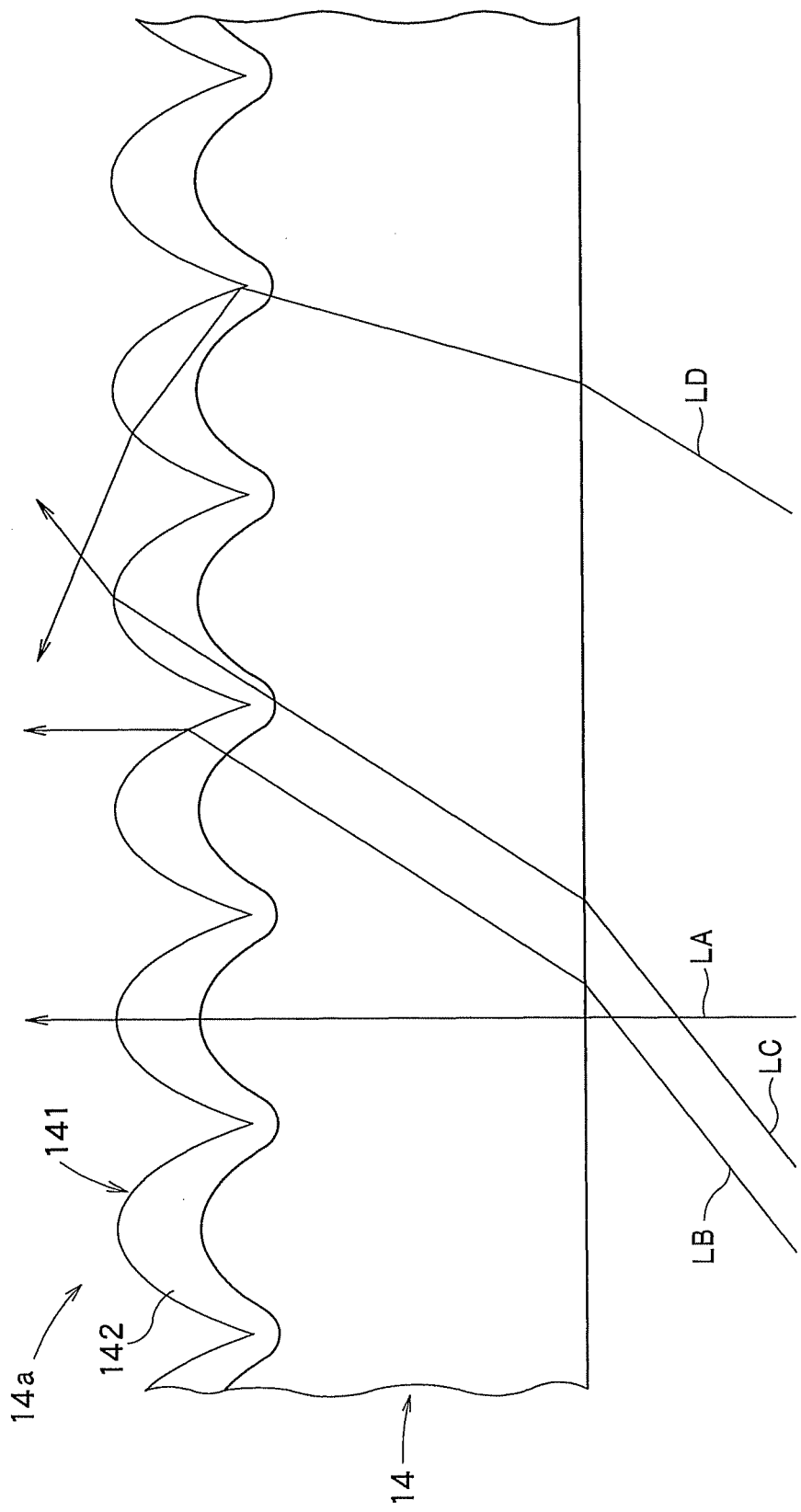
FIG. 4 is a diagram for illustrating various optical paths in which light enters in and then travels through the optical sheet shown in FIG. 2.

FIG. 4 is a diagram showing one example of ways or optical paths in which the light enters into the optical sheet 14 from the light source 13 and then travels through the optical sheet 14. As shown in FIG. 4, it should be noted that the light scattering particles 142a as well as a light scattering effect due to such particles 142a are omitted, and that only each optical path, along which the light would travel on the assumption that the light scattering of the light scattering layer 142 is not exhibited, is shown. In addition, in FIG. 4, only each typical way, in which the light enters into the optical sheet 14 from each corresponding emission tube 13a of the light source 13 would travel through the optical sheet 14, is shown.

Light designated by a beam LA comes or enters into the optical sheet 14 in the normal direction (or at an incident angle of 0°) relative to the sheet surface of the optical sheet 14, and comes out or exits (emerges) from the optical sheet 14, while keeping its traveling route or optical path as it is, without being subjected to any total reflection due to an inner face of one unit lens 141. Namely, the light. LA comes into the optical sheet 14 in a position that is the nearest to one of the emission tubes 13a (or position immediately above the emission tube 13), and then travels toward the apex portion of the unit lens 141 just above such an incident position. Actually, such light will be scattered by the light scattering layer 142 upon coming out from the optical sheet 14. This can prevent the luminance that will be observed in a position just above each emission member 13a of the light source 13 (or position shifted toward the observer side from the emission member 13a of the light source 13 along the normal direction relative to the sheet surface of the optical sheet 14) from being unduly high. As described above, the thickness t1 of the light scattering layer 142 around each apex portion of each unit lens 141 is greater than the thickness t2 of the light scattering layer 142 around each end portion of the unit lens 141. Accordingly, the light, such as the beam LA, will pass through the light scattering layer 142 over a relatively long distance. Therefore, the light LA can be scattered, in a relatively large extent, due to the light scattering layer 142, thus controlling the luminance just above each emission member 13a more adequately.

Light designated by a beam LB comes into the optical sheet 14 at a relatively great incident angle, and then comes out from the optical sheet 14 in an approximately front direction after refracted at an end portion (or position around the valley portion provided between one adjacent pair of the unit lenses 141) of one unit lens 141. Such an optical path is likely to be taken by the light that comes directly, from one of the emission member 13a of the light source 13, into a position of the optical sheet 14 relatively far away from one of the emission members 13a of the light source 13 (or into a position just above the middle point between two emission members 13a located adjacent to each other). For such light LB, it is preferable to allow such light LB to emerge from the optical sheet 14 without lowering front luminance (or luminance measured or observed in a front position) by the scattering effect due to the light scattering layer 142. As described above, the thickness t2 of the light scattering layer 142 around the end portion of each unit lens 141 is less than the thickness t1 of the light scattering layer 142 around the apex portion of the unit lens 141. Namely, the light, such as the beam LB, will pass through a relatively thin portion of the light scattering layer 142. Therefore, an extent that such light LB is scattered will be relatively low, so that unwanted lowering of the luminance in each position around the middle point of each adjacent pair of emission members 13a can be effectively controlled.

Light as designated by a beam LC comes into the optical sheet 14 at a relatively large incident angle, and then comes out from the optical sheet 14 after refracted in a position around the apex portion of one unit lens 141. Thus, such light is likely to emerge from the optical sheet 14 in an unwanted direction that is considerably inclined from the front direction. Accordingly, it is preferable to scatter, as much as possible, such a light by using the light scattering layer 142 so as to reduce a component of light that will emerge in such an unwanted direction, and at the same time so as to increase a component of light that will emerge in an effective or desired direction. As described above, the light scattering layer 142 of each unit lens 141 extends along the light exiting side surface of the unit lens 141 so as to cover and constitute the light exiting side surface of the unit lens 141. Thus, the light, such as the beam LC, passes through the light scattering layer 142 over a relatively long distance. Therefore, the light LC will be scattered effectively by the light scattering layer 142. Accordingly, due to such a light scattering effect, the light that comes out in an effective or desired direction can be increased, as well as the light that comes out in an unwanted direction can be reduced. As described above, the thickness t1 of the light scattering layer 142 around the apex portion of each unit lens 141 is greater than the thickness t2 of the light scattering layer 142 around each end portion of the unit lens 141. Therefore, the light, such as the beam LC, is likely to pass through the light scattering layer 142 over a relatively long distance, as such being scattered more effectively.

Light as expressed by a beam LD comes out from one unit lens 141 after having experienced the total reflection in one end portion of the unit lens 141 (or in a position around one valley portion provided between two unit lenses 141 located adjacent to each other). Similar to the beam LC described above, the beam LD is likely to come out in an unwanted or undesired direction that is unduly inclined from the front direction. Accordingly, it is also preferable to scatter, as much as, such a light b using the light scattering layer 142 so as to reduce the component of light that will emerge in such an unwanted direction, and at the same time so as to increase the component that will emerge in an effective or desired direction. In addition, similar to the light LC described above, the light LD has also a tendency to pass through a neighbor area of the light exiting side surface of the unit lens 141 over a relatively long distance. Therefore, such light LD can also be scattered effectively due to the light scattering layer 142 extending along the light exiting side surface of each unit lens 141 so as to cover and thus constitute the light exiting side surface of the unit lens 141. Accordingly, the light coming out in an effective direction can be increased due to such a light scattering effect, while successfully reducing the light coming out in an undesired direction. Furthermore, as described above, the thickness t1 of the light scattering layer 142 around the apex portion of each unit lens 141 is greater than the thickness t2 of the light scattering layer 142 around each end portion of the unit lens 141. Therefore, the light, such as the beam LD, is likely to pass through the light scattering layer 142 over a relatively long distance, so that the light can be scattered more effectively.

Preferably, the thickness t1 of the light scattering layer 142 around the apex portion of each unit lens 141 is sized ⅓ or more of the arrangement pitch of the unit lens 141 (Condition 1). When the Condition 1 is satisfied, the image of the light source (or light image) can be effectively allowed to be inconspicuous, as well as the light collecting (condensing) effect can be significantly enhanced. Furthermore, the optical sheet satisfying the Condition 1 can be produced by multi-layer extrusion, as such enhancing the productivity of the optical sheet. For instance, the Condition 1 can be satisfied, in the case in which the thickness t1 of the light scattering layer 142 around the apex portion of each unit lens 141 is set at 0.12 mm while the arrangement pitch P of the unit lens 141 is set at 0.3 mm, as described above.

Figure 5:
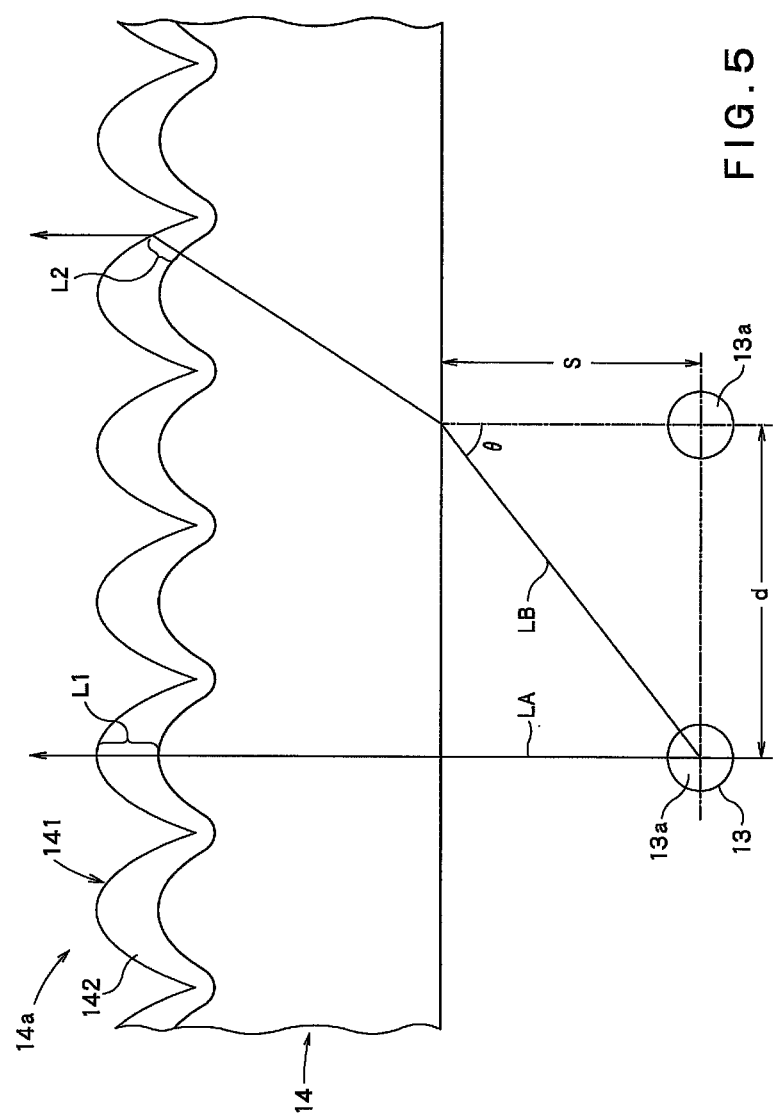
FIG. 5 is a diagram for explaining Condition 2 for enhancing the effect of reducing the luminance unevenness.

FIG. 5 is a diagram for illustrating Condition 2 for enhancing the effect of reducing the luminance unevenness. In the drawing, the emission members 13a of the light source 13 is arranged with an arrangement pitch d, and the optical sheet 14 is located with a space s provided between the optical sheet 14 and a center of the emission members 13a of the light source 13. In this case, in order to effectively reduce the luminance unevenness by using the light scattering layer 142, it is preferred that the following relation (1) can be established (Condition 2).

$$L2 \times 1.2 \leq L1 \leq L2 \times 2.0 \quad (1)$$

In the above relation (1), L1 is a length of the optical path defined through the light scattering layer 142 when the light comes into the optical sheet 14 from one emission member 13a along the normal direction relative to the sheet surface of the optical sheet 14 and then comes out from the optical sheet 14 along the normal direction relative to the sheet surface of the optical sheet 14, without any scattering effect due to the light scattering layer 142, and L2 is a length of the optical path defined through the light scattering layer 142 when the light comes into the optical sheet 14 from the emission member 13a at an angle θ (i.e., arctan (d/s)) and then comes out from the optical sheet 14 along the normal direction relative to the sheet surface of the optical sheet 14, without any scattering effect due to the light scattering effect 142.

As described above, in the case in which the arrangement pitch d of the emission members 13a of the light source 13 is set at 20 mm, and the distance s, in the normal direction relative to the sheet surface of the optical sheet 14, from the center of the emission member 13a of the light source 13 to a surface on a light entering side of the optical sheet 14, is set at 20 mm, the angle θ can be calculated as follows.

$$\theta = \arctan(d/s) = \arctan(20/20) = 45°$$

In this case, L1=t1=0.12 mm, and L2≈t2=0.8 mm, as such the Condition 2 can be satisfied.

In the case of using the optical sheet 14 satisfying such Conditions 1 and 2 for the surface light source device 10a, it have been found that there was no light coming out at an unduly large output angle, and that the light could be effectively collected (converged) at a half value angle (angle of half intensity) of 35°, and that there was no luminance unevenness attributable to the emission tubes 13.

In order to successfully obtain the effect of reducing the luminance unevenness as described above, it is preferred that the arrangement direction of the unit lenses 141 in the light exiting side lens part 14a is parallel with the arrangement direction of the emission members 13a of the light source 13. Therefore, in this embodiment, as shown in FIG. 1, the arrangement direction of the unit lenses 141 in the light exiting side lens part 14a is designed to extend along the arrangement direction of the emission tubes 13a of the light source 13. Thus, the luminance unevenness attributable to the arrangement in which the linear emission tubes 13a are arranged in a direction can be effectively reduced.

According to this embodiment, the thickness t1 of the light scattering layer 142 around the apex portion of each unit lens 141 is designed to be greater than the thickness t2 of the light scattering layer 142 around each end portion of the unit lens 141. Accordingly, the light, such as the beams LC, LD, that is likely to come out in an unwanted direction unduly inclined from the front direction can be effectively scattered. As such, the travel direction of such light can be changed toward the front direction, thereby reducing unwanted light and enhancing the front luminance more effectively.

Furthermore, a part of the scattered light will be returned toward a side of the light source 13. Such returned light is then reflected by the reflector 12 toward the light exiting side, thus it can be utilized again.

Additionally, according to this embodiment, the incident light LA traveling along the normal direction can be scattered more effectively, as compared with the optical sheet disclosed in JP2006-259125A as the reference described in the above paragraph related to the background art. Namely, this embodiment can successfully control undue increase of the luminance that will be observed in a position just above each emission member 13a of the light source 13 (or position shifted toward the observer side from the emission member 13a along the normal direction relative to the sheet surface of the optical sheet 14). Accordingly, this embodiment can allow the image of the light source (or light image) to be inconspicuous as well as can effectively uniform the in-plane distribution of the front luminance. Thus, the optical sheet 14 according to this embodiment can be successfully applied to the surface light source device (e.g., an LED back light) employing a point light source by which the luminance observed in a position around the light source may tend to be unduly high, thereby to uniform the in-plane distribution of the front luminance, more effectively, as compared with the optical sheet disclosed in JP2006-259125A.

In the embodiment described above, it is preferred that the thickness of the light scattering layer 142 is reduced as a point at which the thickness is measured moves from the apex portion of each unit lens 141 toward each end portion of the unit lens 141. This is because the angular distribution of the luminance in a predetermined angular range in which the light is collected can be changed more smoothly. Accordingly, as used herein, what is meant by "the thickness of the light scattering layer 142 is reduced as a measurement position regarding the thickness moves from the apex portion to the end portion" is that the light scattering layer 142 includes no area where the thickness of the scattering layer 142 is increased as measurement position of the light scattering layer 142 moves from the apex portion of each unit lens 141 toward each end portion of the unit lens 141. Alternatively or additionally, in the light scattering layer 142 of the present embodiment, the thickness of the scattering layer 142 is not only reduced gradually as the measurement position regarding the thickness moves from the apex portion of each unit lens 141 toward each end of the unit lens 141, but may be kept constant in some area included in the scattering layer 142.

Second Embodiment

Next, referring to FIG. 6, a second embodiment of the present invention will be described.

Figure 6:
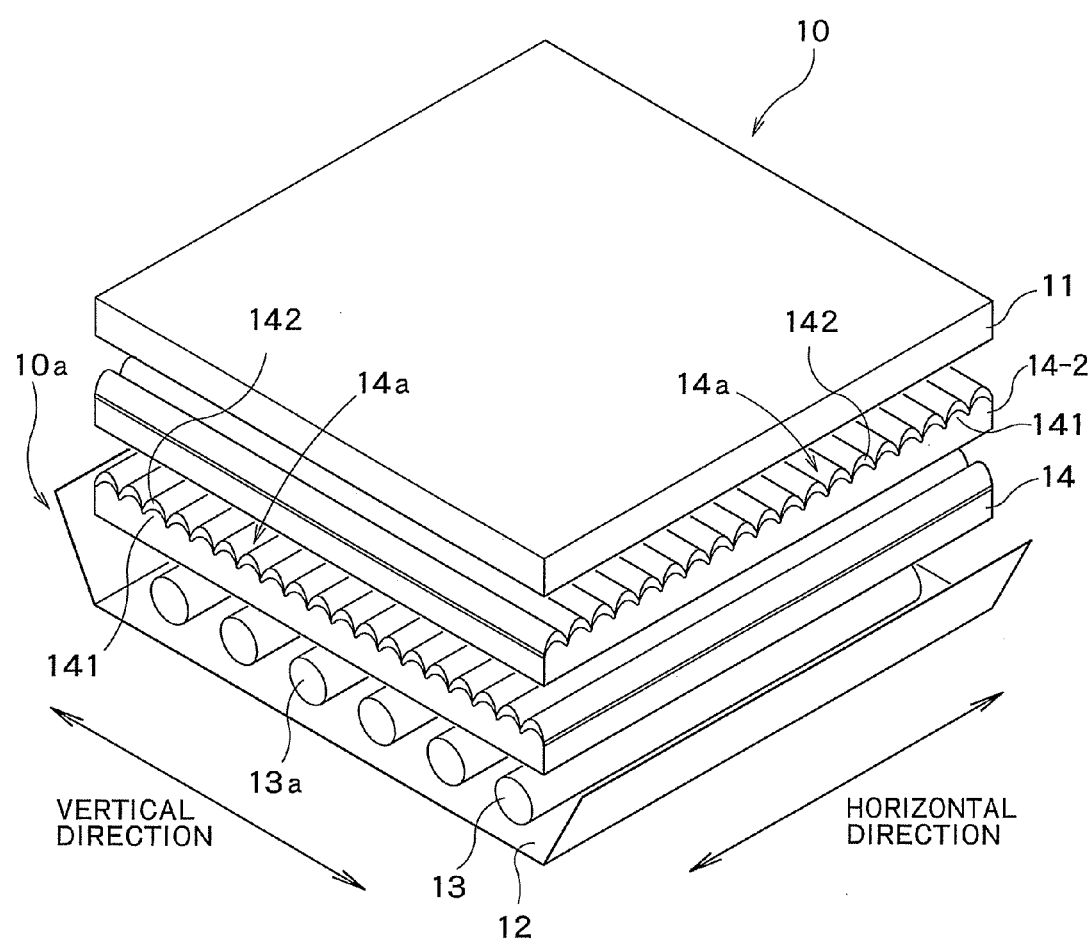
FIG. 6 is a diagram for explaining a second embodiment of the present invention, the diagram being a perspective view showing the transmission display device and the surface light source device.

FIG. 6 is a perspective view showing the transmission display device employing the optical sheet. While only one optical sheet 14 has been used alone in the transmission display device of the first embodiment, two optical sheets 14, 14-2 are used in the transmission display device 10 of the second embodiment Namely, the second embodiment is different from the first embodiment in that the second optical sheet 14-2 is provided therein. However, except for this point, the second embodiment is substantially the same as the first embodiment. Accordingly, in FIG. 6, like parts in the first embodiment will be designated by like reference numerals or characters, and detailed explanations thereof will be omitted below.

The second optical sheet 14-2 has optical properties similar to those of the aforementioned optical sheet 14, and has the same constructions as that of the optical sheet 14. Namely, the second optical sheet 14-2 may include the light exiting side lens part 14a constituting the light exiting side surface. Similarly, the light exiting side lens part 14a may include the plurality of unit lenses 14 juxtaposed to one another and each being convex toward the light exiting side. Furthermore, the light scattering layer 142 configured to scatter light may be provided onto each unit lens 141. The light scattering layer 142 extends along the light exiting side surface of each convex unit lens 141, so as to cover and constitute the light exiting side surface of the unit lens 141. Preferably, the thickness of the light scattering layer 142 around the apex portion of each unit lens 141 is greater than the thickness t2 of the light scattering layer 142 around each end portion of the unit lens 141.

As shown in FIG. 6, the second optical sheet 14-2 is arranged such that a direction in which the optical path is mainly controlled by the optical sheet 14 and another direction in which the optical path is mainly controlled by the second optical sheet 14-2 will be perpendicular to each other. Namely, the second optical sheet 14-2 is arranged such that the optical sheet 14 mainly controls an optical path with respect to a first direction, and the second optical sheet 14-2 mainly controls an optical path with respect to a second direction perpendicular to the first direction. More specifically, the arrangement direction of the unit lenses 141 in the second optical sheet 14-2 (the direction in which the unit lenses 141 are arranged) is perpendicular to the arrangement direction of the unit lenses in the optical sheet 14.

According to such a second embodiment, with a proper design of the light exiting side lens part of each optical sheet 14, 14-2, the optical path of the light coming out from the surface light source device 10a can be independently controlled both in the vertical direction and in the horizontal direction. Accordingly, such a second embodiment can utilize the light more effectively, as such providing desirable illumination light having higher front luminance.

Third Embodiment

Now, referring to FIGS. 7 to 18, a third embodiment of the present invention will be described.

The third embodiment is different from the aforementioned first embodiment in that a prism sheet (or second optical sheet) 15 having a prism part 15a including a plurality of unit prisms 151 is further provided therein. However, except for this point, the third embodiment is substantially the same as the first embodiment. Therefore, in FIGS. 7 to 18, like parts in the first embodiment will be designated by like reference numerals or characters, and details thereof will now be omitted.

First, the construction and operation of the prism sheet (or second optical sheet) 15 will be discussed. As shown in FIGS. 7 to 18, the prism sheet 15 includes the prism part 15a provided with the plurality of unit prisms 151 juxtaposed to one another. In the prism part 15a of the prism sheet 15 of this embodiment shown in FIGS. 7 to 18, the plurality of unit prisms 151 are arranged in one direction, and each unit prism 151 extends linearly in the other direction perpendicular to the arrangement direction (i.e., the one direction). Each unit prism 151 has an apex point 151a in its section taken along the arrangement direction. Typically, each unit prism 151 has a triangular shape in the section taken along the arrangement direction (or principal section). As used herein, the "triangular shape" not only means a triangular shape in the strict sense of the word, but also includes a substantially triangular shape involving a limit (bound) of precision of a manufacturing technique, an error associated with a molding process and the like. Namely, a triangular shape including a rounded apex portion, a triangular shape with a head portion cut off (i.e., truncated triangular shape) and the like may also be included in the "triangular shape."

Figure 15:
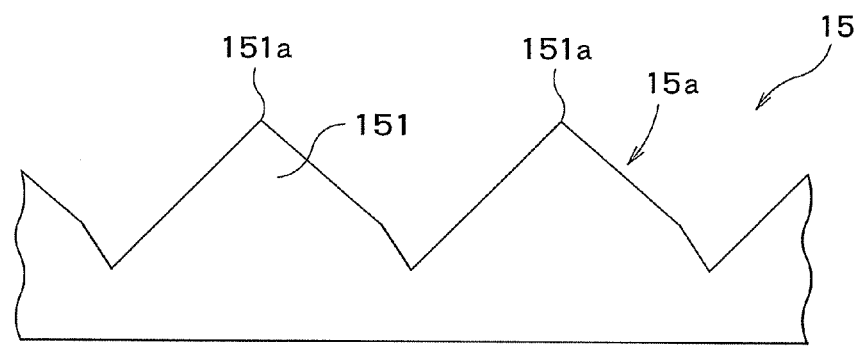
FIG. 15 is a section showing one variation of a second optical sheet (or prism sheet).

It should be noted that the sectional shape of each unit prism 151 is not necessarily triangular, but the sectional shape of each unit prism 151 may be a shape formed by adding proper modification and/or variation to the triangular shape for the purpose of providing desired properties to the prism. For instance, as shown in FIG. 15, in order to provide proper optical functions to the prism, the sectional shape of each unit prism 151 may be a triangular shape in which one or more sides are bent, curved, or provided with fine concavo-convex features. Alternatively, the sectional shape of each unit prism 151 may be another shape than the triangular shape, including various shapes, such as a trapezoidal shape and the like. Furthermore, the sectional shape of the unit prisms 151 may be formed by properly combining the triangular shape and another shape than the triangular shape (such as by alternately arranging these shapes).

The prism sheet (or second optical sheet) 15 may be formed from a resin having a higher optical transparency, such as a polycarbonate resin, an acryl-styrene resin or the like.

As shown in FIGS. 7 to 14, the prism sheet (or second optical sheet) 15 may be located such that each unit prism 151 can be projected on the light exiting side or such that each unit prism 151 can be projected on a side opposite to the light exiting side. First, the operation of the prism sheet 15 (or prism part 15a), in the case in which the prism sheet 15 is arranged such that each unit prism 151 is projected on the light exiting side, will be described, with reference to FIG. 16.

Figure 16:
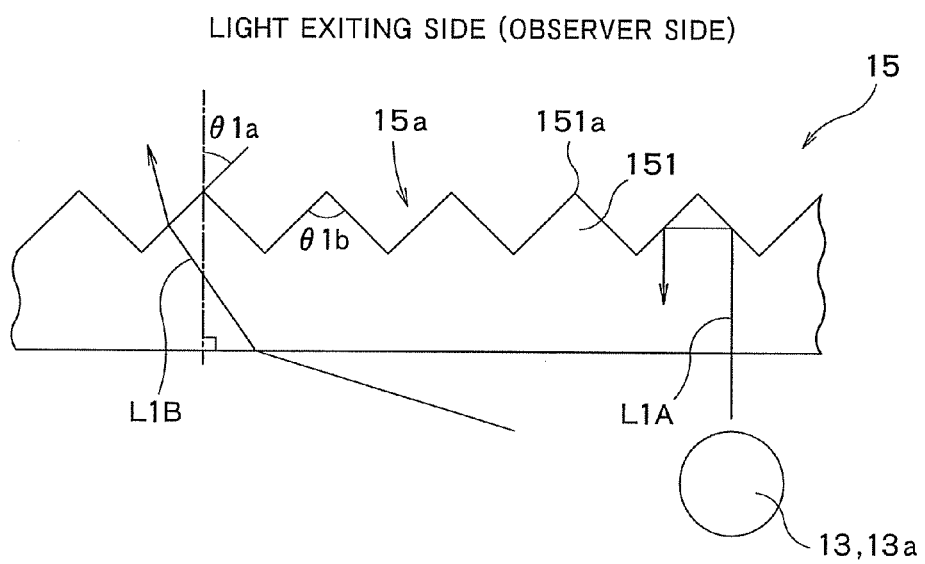
FIG. 16 is a diagram for explaining an effect of the second optical sheet (or prism sheet).

As shown in FIG. 16, each unit prism 151 projected on the light exiting side can allow light L1A that is not inclined in a greater extent to the normal direction relative to a surface of the prism sheet 15 to be totally reflected, so as to return the light toward the light source 13. A part of the light, which is made to be totally reflected and to be returned toward the light source 13, will be reflected by the reflector 12, such that the travel direction of the light will be changed toward the light exiting side, so as to be utilized again. In addition, each unit prism 151 projected on the light exiting side can refract light L1B that is inclined in a greater extent to the normal direction relative to the sheet surface of the prism sheet 15, thereby to change the travel direction of the light L1B toward the front direction. This construction can prevent the front luminance that will be observed in a position just above each emission member 13a of the light source 13 (or position shifted toward the light exiting side from each emission member 13a along the normal direction relative to the sheet surface of the prism sheet 15) from being excessively high. In addition, such construction can effectively increase the front luminance that will be observed around a position just above each middle point between two adjacent emission members 13a of the light source 13 (or around a position shifted toward the light exiting side from each middle point between two adjacent emission members 13a of the light source 13 along the normal direction relative to the sheet surface of the prism sheet 15). Furthermore, in the case in which a surface of the prism sheet 15 opposed to the light exiting side is a flat face, it is also possible to refract the light coming into the prism sheet, such that the travel direction of the light can be changed so that the travel direction is inclined in a smaller extent to the front direction than before the refraction. From these effects, the in-plane distribution of the front luminance can be effectively uniformed.

In order to effectively achieve such an operation of the prism sheet 15 (or prism part 15a), an inclined face of each unit prism 151, which serves as a total reflection surface and/or refraction surface, is preferably inclined, with an inclination angle θ1a (see FIG. 16) within a range of from 40° to 55°, more preferably of 45°, to the normal direction relative to the sheet surface of the prism sheet 15. Accordingly, in the case in which each unit prism 151 has an isosceles-triangular shape in the section taken along the arrangement direction (see FIG. 16), a vertex angle θ1b is preferably within a range of from 80° to 110°, more preferably 90°.

Figure 17:
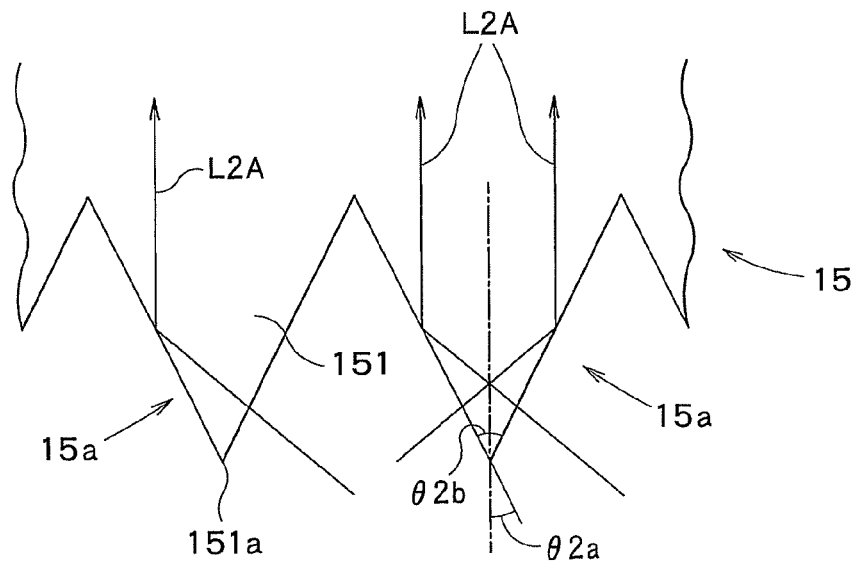
FIG. 17 is an alternative diagram for explaining the effect of the second optical sheet (or prism sheet).

Next, the effect of the prism sheet 15 (or prism part 15a) in the case in which the prism sheet 15 is arranged such that each unit prism 151 is projected on the opposite side to the light exiting side will be discussed, with reference to FIG. 17.

Each unit prism 151 projected on the opposite side to the light exiting side can refract light that is not inclined in a greater extent to the normal direction relative to the sheet surface of the prism sheet 15, so as to change the travel direction of the light, and allow the light to travel in the prism sheet 15. On the other hand, as shown in FIG. 17, each unit prism 151 projected on the opposite side to the light exiting side can allow light L2A that is inclined in a greater extent to the normal direction relative to a surface of the prism sheet 15 to be totally reflected, so as to greatly change the travel direction of the light L2A so that the travel direction is inclined in a substantially smaller extent to the front direction than before the total reflection. In the case in which each unit prism 151 has a triangular shape in the section taken along its arrangement direction, a face corresponding to one side of such a sectional triangle can serve as an incident face through which the light emitted from the light source 13 can enter into the prism, while another face corresponding to the other side of the sectional triangle can serve as a total reflection face configured to allow incident light to be totally reflected. Namely, this construction can prevent the front luminance that will be observed in a position just above each emission member 13a of the light source 13 (or position shifted toward the light exiting side from the emission member 13a along the normal direction relative to the sheet surface of the prism sheet 15) from being excessively high. In addition, such construction can effectively increase the front luminance that will be observed around a position just above each middle point between two adjacent emission members 13a of the light source 13 (or around a position shifted toward the light exiting side from each middle point between two adjacent emission members 13a of the light source 13 along the normal direction relative to the sheet surface of the prism sheet 15). Consequently, the in-plane distribution of the front luminance can be effectively uniformed.

In order to effectively achieve such an operation of the prism sheet 15 (or prism part 15a), the inclined face of each unit prism 151, which serves as the total reflection face, is preferably inclined, with an inclination angle θ2a (see FIG. 17) within a range of from 20° to 35°, to the normal direction relative to the sheet surface of the prism sheet 15. Accordingly, in the case in which each unit prism 151 has an isosceles-triangular shape in the section taken along the arrangement direction, a vertex angle θ2b is preferably within a range of from 40° to 70°.

Next, a specific example of an optical member 20, constructed by combining the prism sheet 15 (or second optical sheet) as described above and the optical sheet (or first optical sheet) 14 as previously described, will be discussed, with reference to FIGS. 7 to 14. The optical member 20, which will be discussed below, is configured to be incorporated in the surface light source device 10a, for the purpose of making the in-plane front luminance uniform as well as for providing sufficiently higher front luminance.

Figure 7:
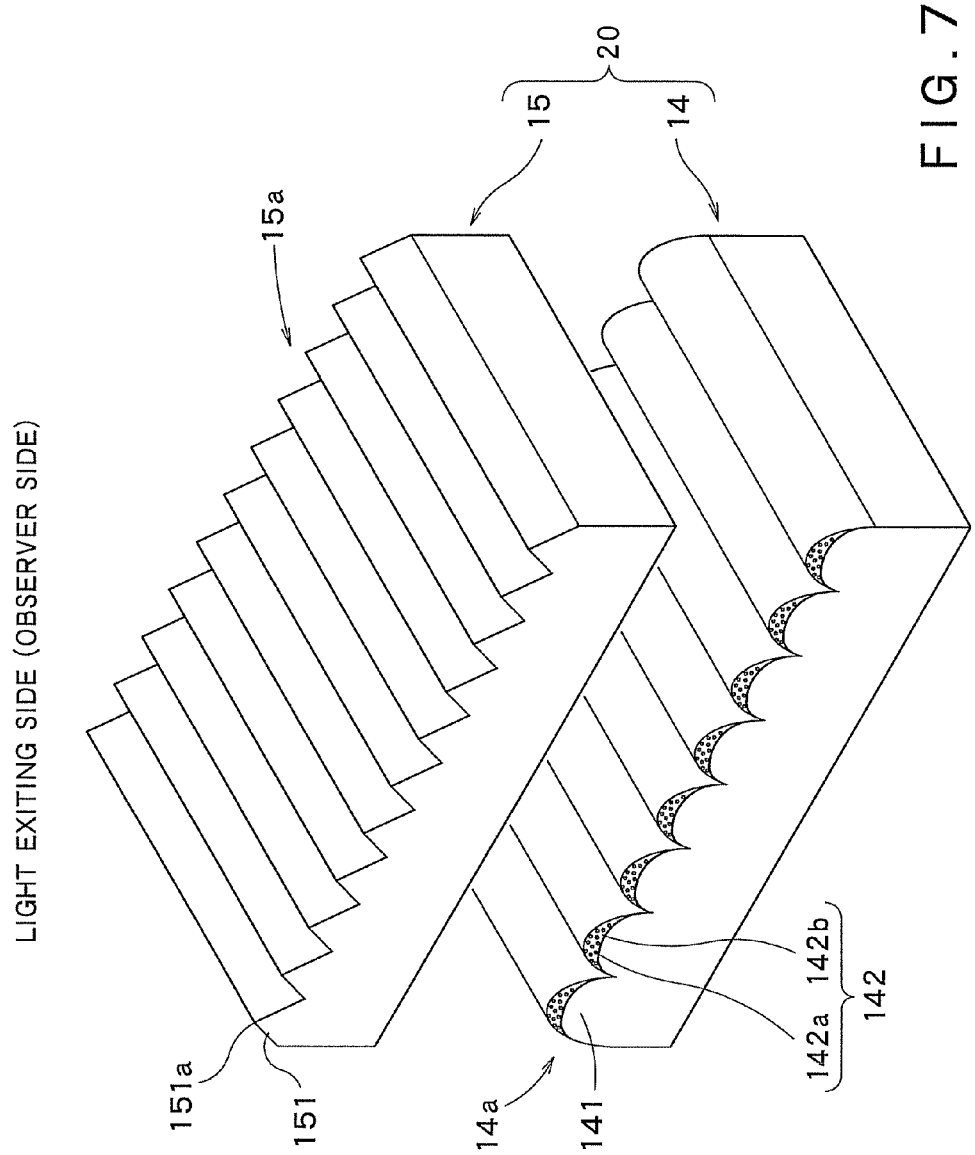
FIG. 7 is a diagram for explaining a third embodiment of the present invention, the diagram being a perspective view schematically showing one example of construction of an optical member.

In the optical member 20 as shown in FIG. 7, the second optical sheet (or prism sheet) 15 is located on the light exiting side of the first optical sheet 14. The second optical sheet (or prism sheet) 15 is provided such that each unit prism 151 is projected toward the light exiting side. The arrangement direction of the unit prisms 151 is parallel to the arrangement direction of the unit lenses 141. In such an optical member, each inclined face of each unit prism 151 of the second optical sheet 15 is preferably inclined in a greater extent to the normal direction relative to the sheet surface of the prism sheet 15, in order to prevent the light inclined in a small extent to the front direction by the first optical sheet 14 from being subjected to the total reflection by the unit prism 151 and thus returned again toward the first optical sheet 14. Specifically, it is preferred that the inclined face of each unit prism 151 is inclined, at the inclination angle of 45° or greater, to the normal direction relative to the sheet surface of the prism sheet 15. Accordingly, in the case in which each unit prism 151 has an isosceles-triangular shape in the section taken along the arrangement direction, the vertex angle is preferably 90° or greater.

Figure 8:
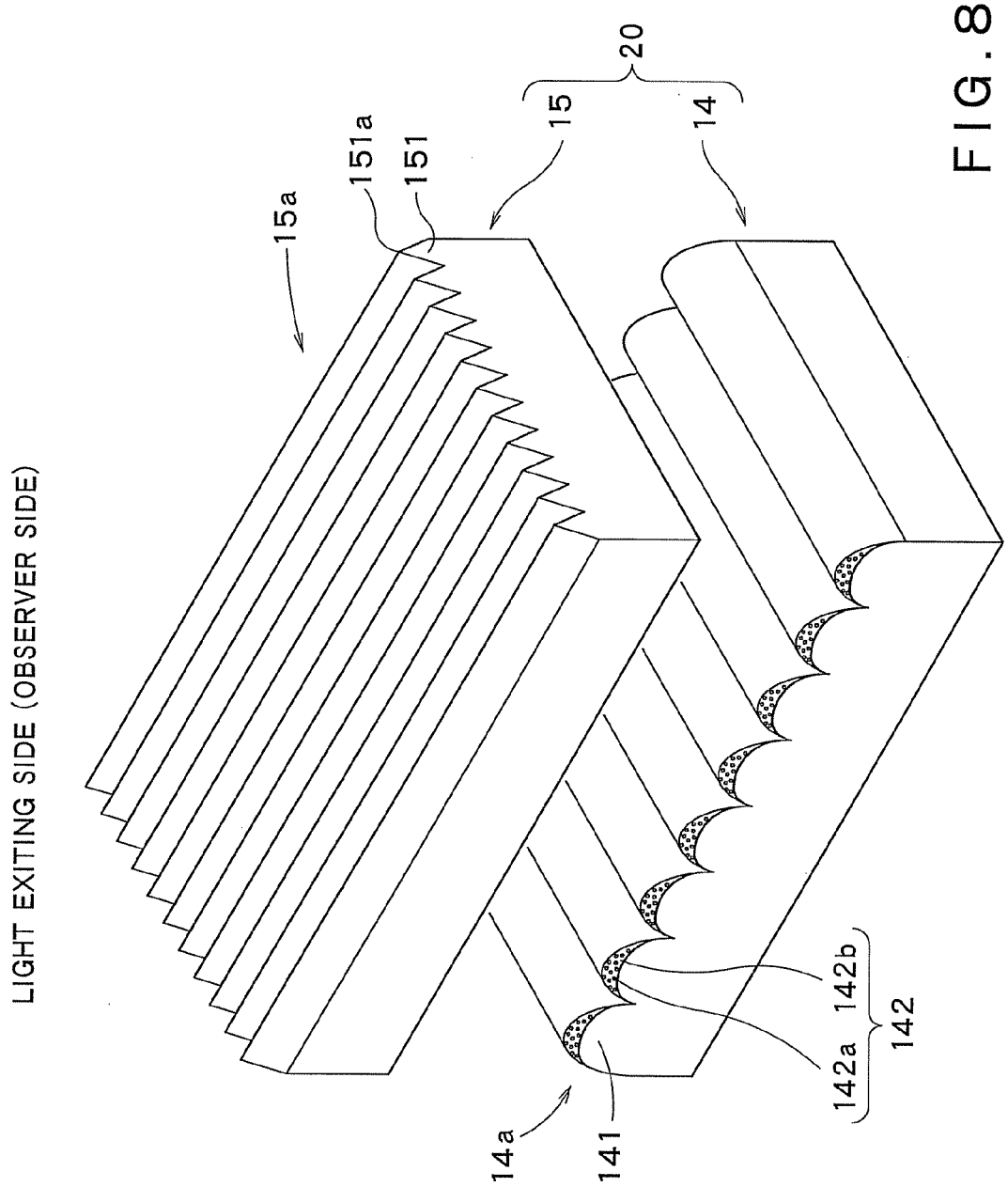
FIG. 8 is a diagram for explaining the third embodiment of the present invention, the diagram being a perspective view schematically showing another example of the construction of the optical member.

Alternatively, in the optical member 20 as shown in FIG. 8, the second optical sheet (or prism sheet) 15 is located on the light exiting side of the first optical sheet 14. The second optical sheet (or prism sheet) 15 is provided such that each unit prism 151 is projected toward the light exiting side. The arrangement direction of the unit prisms 151 is perpendicular to the arrangement direction of the unit lenses 141.

Figure 9:
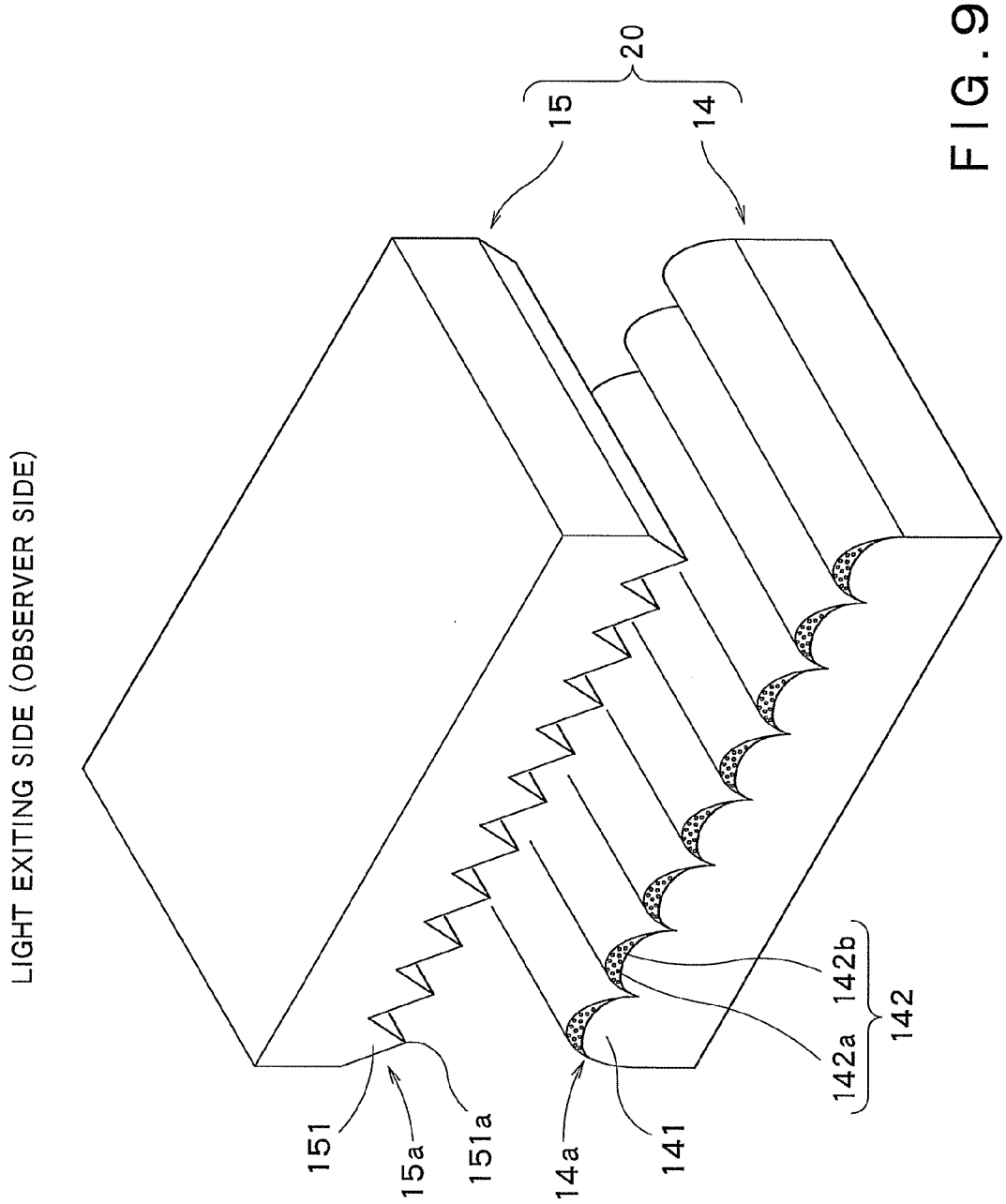
FIG. 9 is a diagram for explaining the third embodiment of the present invention, the diagram being a perspective view schematically showing still another example of the construction of the optical member.

Alternatively, in the optical member 20 as shown in FIG. 9, the second optical sheet (or prism sheet) 15 is located on the light exiting side of the first optical sheet 14. The second optical sheet (or prism sheet) 15 is provided such that each unit prism 151 is projected toward the opposite side to the light exiting side. The arrangement direction of the unit prisms 151 is parallel to the arrangement direction of the unit lenses 141.

Figure 10:
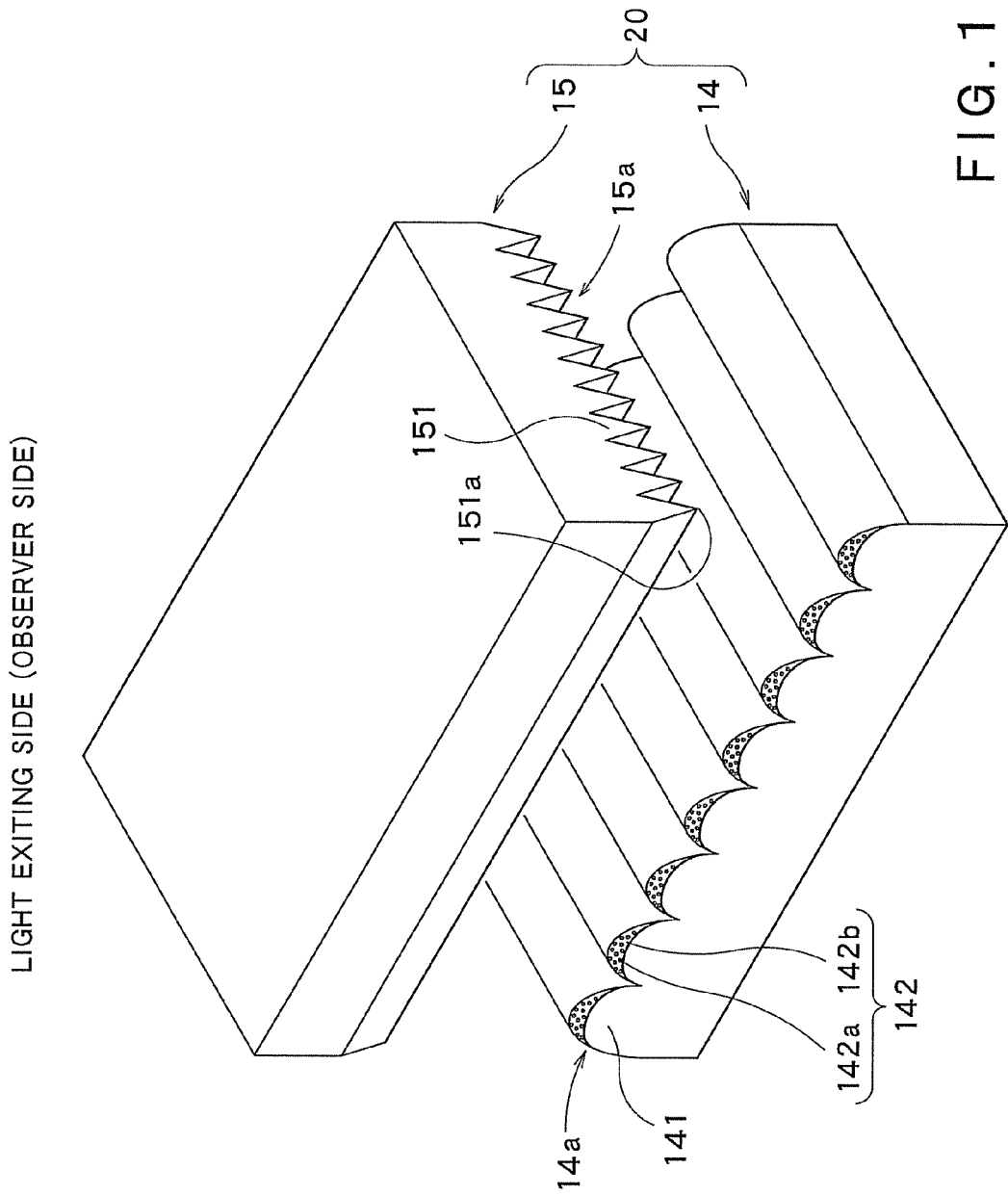
FIG. 10 is a diagram for explaining the third embodiment of the present invention, the diagram being a perspective view schematically showing yet still another example of the construction of the optical member.

Alternatively, in the optical member 20 as shown in FIG. 10, the second optical sheet (or prism sheet) 15 is located on the light exiting side of the first optical sheet 14. The second optical sheet (or prism sheet) 15 is provided such that each unit prism 151 is projected toward the opposite side to the light exiting side. The arrangement direction of the unit prisms 151 is perpendicular to the arrangement direction of the unit lenses 141.

Figure 11:
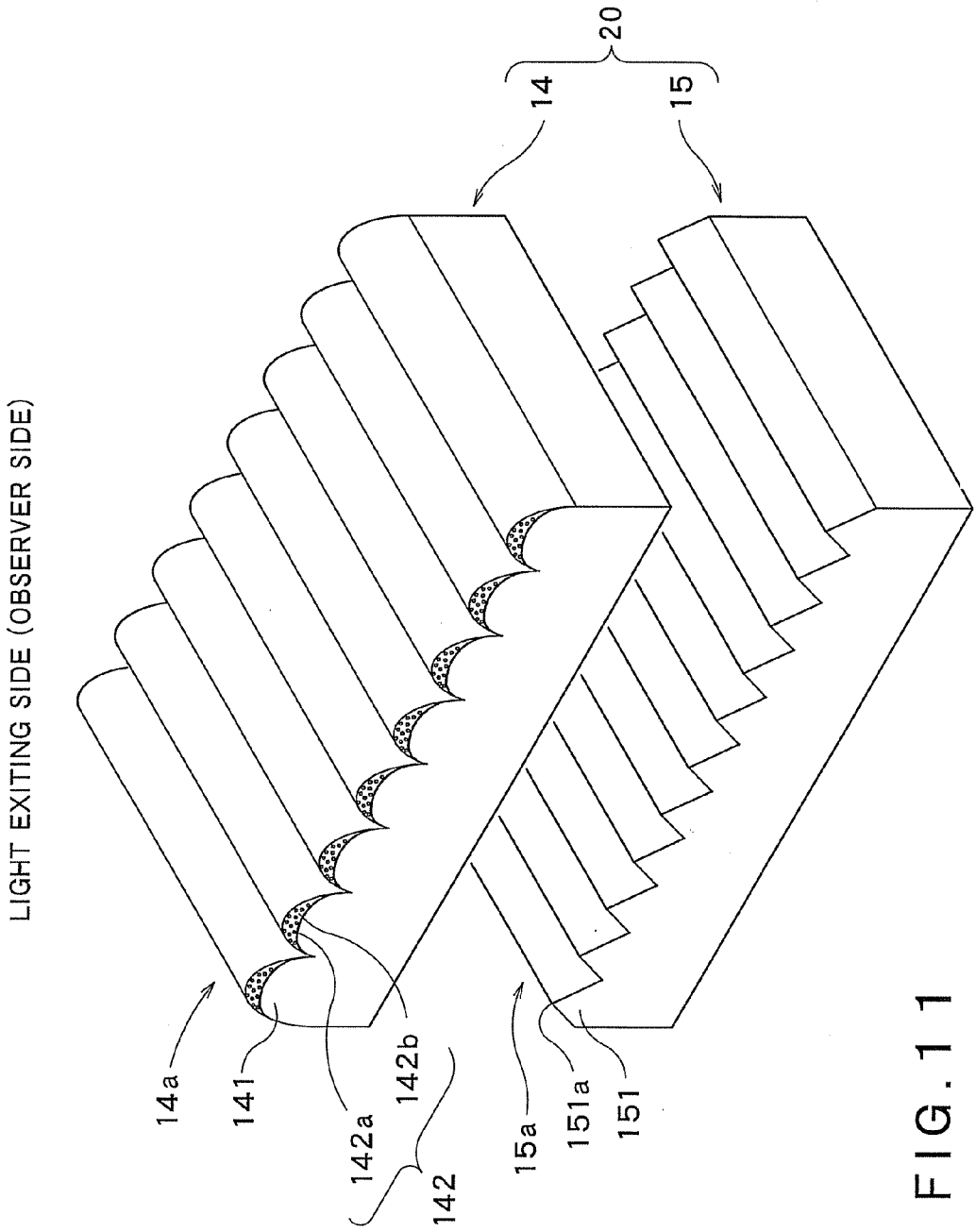
FIG. 11 is a diagram for explaining the third embodiment of the present invention, the diagram being a perspective view schematically showing still another example of the construction of the optical member.

Alternatively, in the optical member 20 as shown in FIG. 11, the first optical sheet 14 is located on the light exiting side of the second optical sheet (or prism sheet) 15. The second optical sheet (or prism sheet) 15 is provided such that each unit prism 151 is projected toward the light exiting side. The arrangement direction of the unit prisms 151 is parallel to the arrangement direction of the unit lenses 141.

Figure 12:
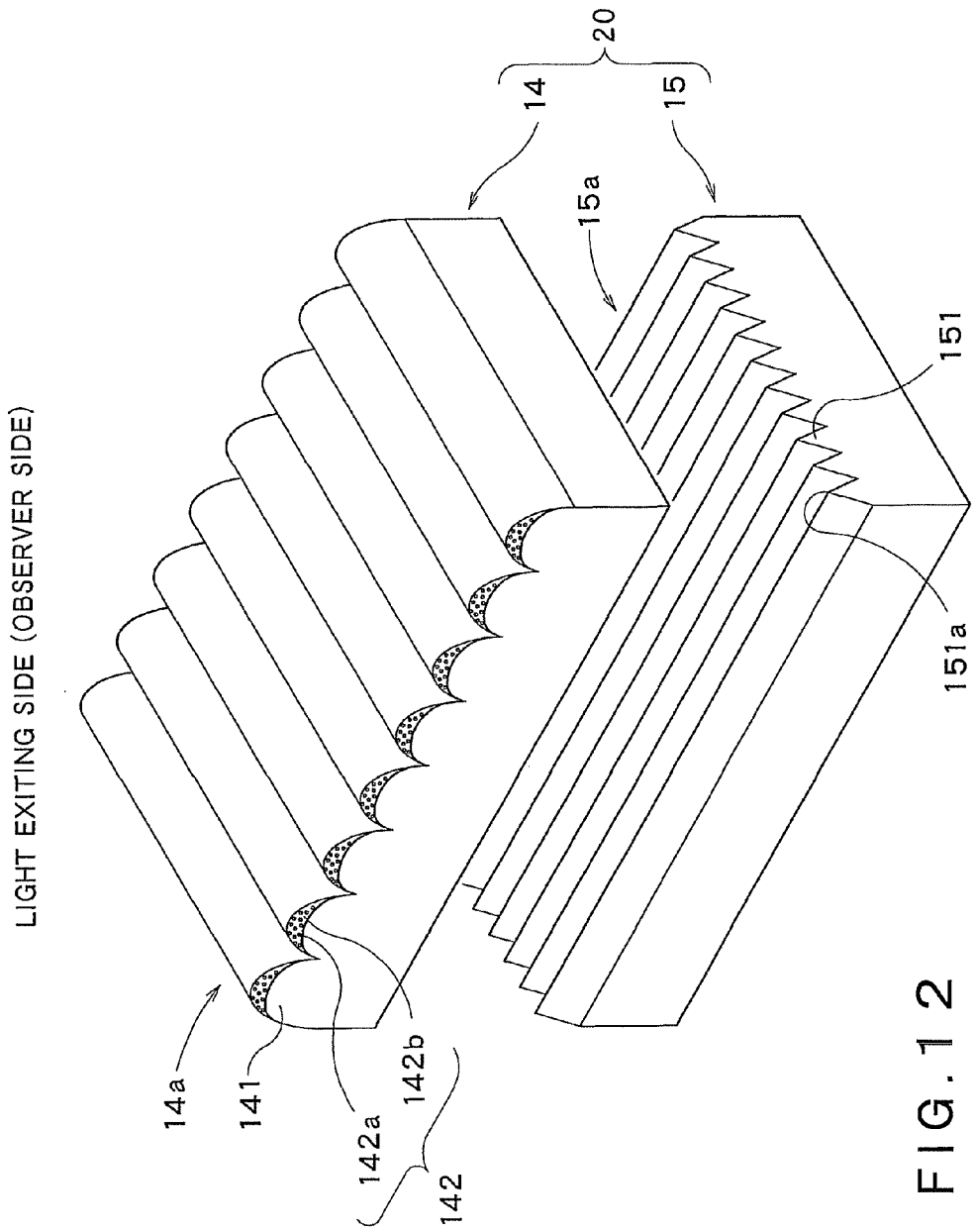
FIG. 12 is a diagram for explaining the third embodiment of the present invention, the diagram being a perspective view schematically showing yet still another example of the construction of the optical member.

Alternatively, in the optical member 20 as shown in FIG. 12, the first optical sheet 14 is located on the light exiting side of the second optical sheet (or prism sheet) 15. The second optical sheet (or prism sheet) 15 is provided such that each unit prism 151 is projected toward the light exiting side. The arrangement direction of the unit prisms 151 is perpendicular to the arrangement direction of the unit lenses 141.

Figure 13:
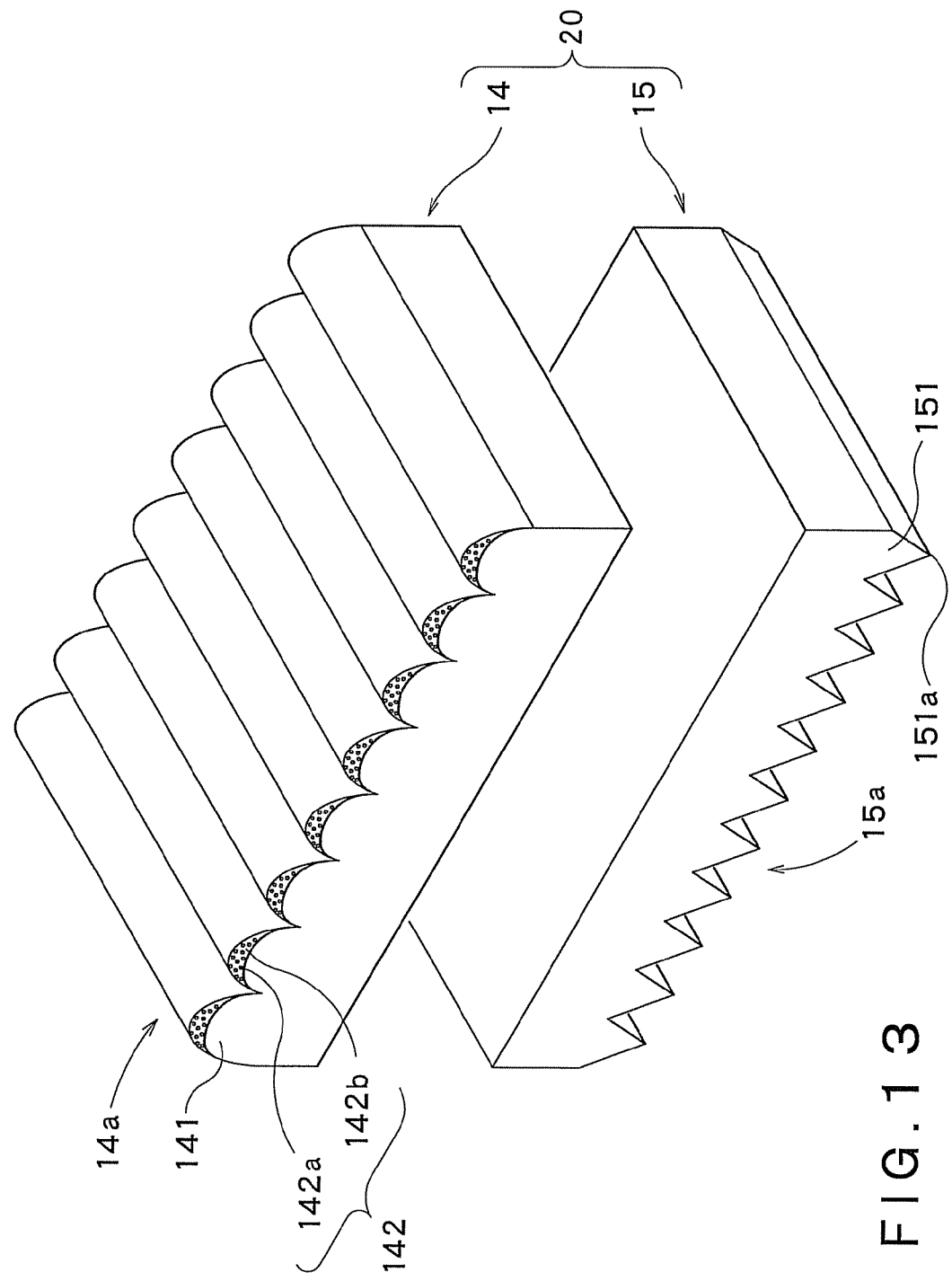
FIG. 13 is a diagram for explaining the third embodiment of the present invention, the diagram being a perspective view schematically showing still another example of the construction of the optical member.

Alternatively, in the optical member 20 as shown in FIG. 13, the first optical sheet 14 is located on the light exiting side of the second optical sheet (or prism sheet) 15. The second optical sheet (or prism sheet) 15 is provided such that each unit prism 151 is projected toward the opposite side to the light exiting side. The arrangement direction of the unit prisms 151 is parallel to the arrangement direction of the unit lenses 141.

Figure 14:
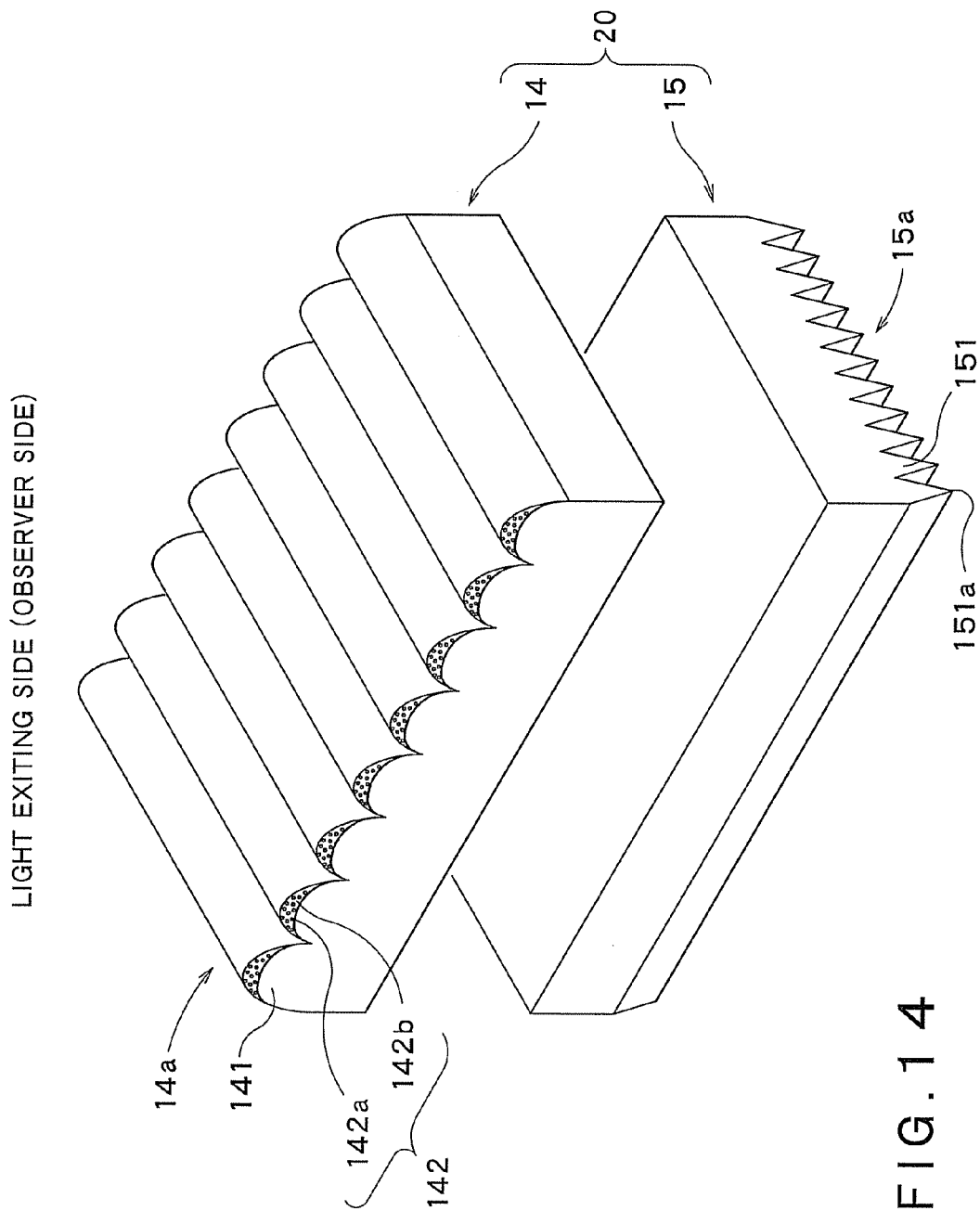
FIG. 14 is a diagram for explaining the third embodiment of the present invention, the diagram being a perspective view schematically showing yet still another example of the construction of the optical member.

Alternatively, in the optical member 20 as shown in FIG. 14, the first optical sheet 14 is located on the light exiting side of the second optical sheet (or prism sheet) 15. The second optical sheet (or prism sheet) 15 is provided such that each unit prism 151 is projected toward the opposite side to the light exiting side. The arrangement direction of the unit prisms 151 is perpendicular to the arrangement direction of the unit lenses 141.

With provision of each optical member 20 as shown and described above, in place of, for example, the optical sheet shown in FIG. 1, the surface light source device 10*a* and transmission display device 10 can also be obtained.

Figure 18:
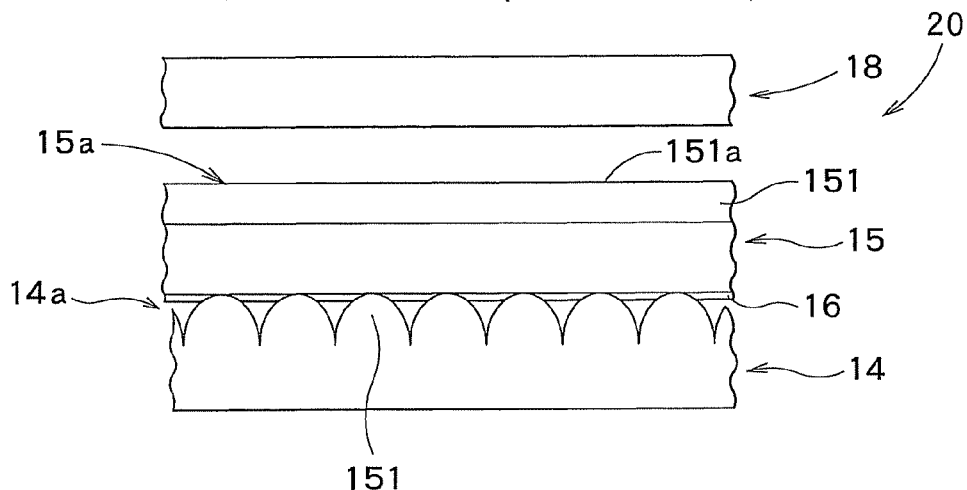
FIG. 18 is a section for explaining one variation of the optical member.

In each of the optical members 20 as described above, the first optical sheet 14 and the second optical sheet 15 are preferably fixed in position relative to each other. For instance, as shown in FIG. 18, an adhesive layer 16 may be further provided between the first optical sheet 14 and the second optical sheet 15, in order to provide mutual fixation between the first optical sheet 14 and the second optical sheet 15. By incorporating such an optical member 20, as a single member, into the surface light source device 10*a*, the first optical sheet 14 and the second optical sheet 15 can be incorporated into the surface light source device 10*a*, readily and rapidly, at a time, while being accurately fixed in position relative to each other. Additionally, this construction can prevent invasion of foreign matter into a space between the first optical sheet 14 and the second optical sheet 15. Furthermore, such construction can successfully prevent a mutual positional shift between the first optical sheet 14 and the second optical sheet 15, which may be caused by warp and/or bending associated with environmental changes of temperature, humidity and the like, while the optical member 20 is incorporated and used in the transmission displace device 10, especially in a large-size liquid crystal display device.

Above all, as shown in FIG. 18, it is preferred that at least one of the apex portion of each unit lens 141 of the light exiting side lens part 14*a* and the apex portion of each unit prism 151 of the prism part 15*a* is stuck into the adhesive layer 16, as such fixing the first optical sheet 14 and the second optical sheet 15 in position relative to each other via the adhesive layer 16. In such an optical member 20, provision of a sufficiently small thickness of the adhesive layer 16 relative to height of the projection of each unit lens 141 and/or each unit prism 151 enables the unit lens 141 and/or unit prism 151 to be stuck into the adhesive layer 16 only in a position around each apex portion thereof. In this case, in other positions than the position around each apex portion, an interface between the unit lens 141 and/or unit prism 151 and an ambient atmosphere (typically air) can be maintained. Therefore, the first optical sheet 14 and the second optical sheet 15 can be adhered and fixed relative to each other, with ease, while maintaining an optical function or features of the light exiting side lens part 14*a* and/or an optical function or features of the prism part 15*a*.

In an example shown in FIG. 18, the first optical sheet 14 and the second optical sheet 15 of the optical member 20 shown in FIG. 8 are fixed relative to each other via the adhesive layer 16. In this example, the adhesive layer 16 is positioned between a flat face located on the side opposite to the light exiting side of the second optical sheet 15 and the light exiting side lens part 14*a* of the first optical sheet 14, with the apex portion of each unit lens 141 of the light exiting side lens part 14*a* being contacted and stuck into the adhesive layer 16. In this way, the first optical sheet 14 and the second optical sheet 15 are fixed relative to each other via the adhesive layer 16. Similarly, the first optical sheet 14 and the second optical sheet 15 of the optical member 20 shown in FIG. 7 can also be fixed relative to each other via the adhesive layer 16.

In the case in which the adhesive layer 16 is provided between the first optical sheet 14 and the second optical sheet 15 of the optical member 20 shown in either of FIG. 11 or FIG. 12, the apex portion of each unit prism 151 of the prism part 15*a* can be stuck into the adhesive layer 16, so that the flat face located on the opposite side to the light exiting side of the first optical sheet 14 and the prism part 15*a* of the second optical sheet 15 can be fixed due to the adhesive layer 16. Thus, the first optical sheet 14 and the second optical sheet 15 can be fixed relative to each other via the adhesive layer 16.

In the case in which the adhesive layer 16 is provided between the first optical sheet 14 and the second optical sheet 15 of the optical member 20 shown in either of FIG. 9 or FIG. 10, the apex portion of each unit lens 141 of the light exiting side lens part 14*a* is stuck into the adhesive layer 16, while the apex portion of each unit prism 151 of the prism part 15*a* is stuck into the adhesive layer 16, so that the light exiting side lens part 14*a* of the first optical sheet 14 and the prism part 15*a* of the second optical sheet 15 can be fixed by means of the adhesive layer 16. Consequently, the first optical sheet 14 and the second optical sheet 15 can be fixed relative to each other via the adhesive layer 16.

The adhesive layer 16 may be formed from a resin having a higher optical transparency, such as a urethane resin, a polyester resin, an acryl resin, an epoxy resin, an ethylenevinyl acetate resin and the like. It is noted that the "adhesive layer" used herein includes a viscous or gluing layer.

In the example shown in FIG. 18, a polarized light separation film (or polarized light separation sheet) 18 is further provided on the light exiting side of the optical member 20. Such an optical member 20 (or surface light source device 10a or transmission display device 10) to which the polarized light separation film 18 is added can further enhance the luminance. While not shown, the aforementioned adhesive layer 16 may also be provided between the polarized light separation layer 18 and the optical member 20. In this case, the optical member 20 and the polarized light separation layer 18 can be adhered and fixed relative to each other, while maintaining the optical function or features of the light exiting side lens part 14a and/or the optical function or features of the prism part 15a (or while maintaining the optical function or features of the prism part 15a located outermost on the light exiting side of the optical member 20, especially in the example shown in FIG. 18).

The light source 13 has been so far described as one located in a position opposed to the optical sheet 14 and prism sheet 15. In other words, only the example in which the light source 13 is located in the position opposed to the optical sheet 14 and prism sheet 15 has been discussed. However, the location of the light source 13 is not limited to this aspect. Namely, since the optical sheet 14 and/or the prism sheet 15 can effectively change the travel direction of the light that is significantly inclined to the normal direction relative to the sheet surface toward the front direction, such an optical sheet 14 and/or the prism sheet 15 can also be applied to the surface light source device of, for example, an edge-light type (also referred to as a side-light type or side-edge type). Especially, with respect to the optical members 20 shown in FIGS. 13 and 14, since the travel direction of the light coming in at a significantly greater incident angle can be effectively changed toward the front direction by each unit prism 151, such an optical member can be applied suitably to the surface light source device of the edge-light type. Otherwise, such an optical member can also be applied to the surface light source device of an electroluminescent (EL) type.

In the optical sheet 14 incorporated into each of the optical members 20 shown in FIGS. 7 to 14, the light scattering layer 142 is provided to constitute only a part of the surface of the light exiting side of each unit lens 141. Namely, in each example shown in the drawing, the light scattering layer 142 extends from the apex portion of each unit lens 142 toward both ends thereof, such that almost no light scattering layer 142 is provided at each end of the unit lens 141. Therefore, the thickness of the light scattering layer 142 at each end of the unit lens 141 can be considered as zero (0). In addition, as described above, the thickness of the light scattering layer 142 is gradually reduced as one moves away from the apex portion of each unit lens 141.

In each of the optical members 20 shown in FIGS. 7 to 14, the optical sheet 14 and the prism sheet 15 have been arranged such that the arrangement direction of the unit lenses 141 of the light exiting side lens part 14a and the arrangement direction of the unit prisms 151 of the prism part 15a can be in a parallel or perpendicular relationship relative to each other. However, the arrangement relationship between the two sheets is not limited to this aspect. Namely, the optical sheet 14 and the prism sheet 15 may be arranged, such that the arrangement direction of the unit lenses 141 of the light exiting side lens part 14a and the arrangement direction of the unit prisms 151 of the prism part 15a will be in an oblique or angular relationship other than 90° relative to each other.

Furthermore, the face on which the prism part 15a of the prism sheet (or second optical sheet) 15 is not provided, may be formed as a mat face provided with fine concavo-convex features. In such a case, a light diffusing function of the prism sheet (or second optical sheet) 15 can be enhanced, as such effectively suppressing occurrence of the image of each emission member 13a (or light image) of the light source 13. In place of using the mat face, for example, by utilizing light diffusing particles dispersed in the prism sheet (or second optical sheet) 15, the light diffusing function of the prism sheet (or second optical sheet) 15 may also be provided. Similarly, such a diffusing function may also be provided to the optical sheet 14.

(Modifications)

The present invention is not limited to the several embodiments as shown and described above, and various modifications and variations can be made without departing from the scope and spirit of this invention.

For instance, in each embodiment described above, one example, in which the shape of each unit lens 141 is a part of an elliptic column that has a major axis extending along the normal direction relative to the sheet surface and is arranged in connection with one another, has been discussed. However, the shape of each unit lens 141 is not limited to this aspect. For example, it may be a part of a spheroid having a major axis extending along the normal direction relative to the sheet surface.

Figure 19:
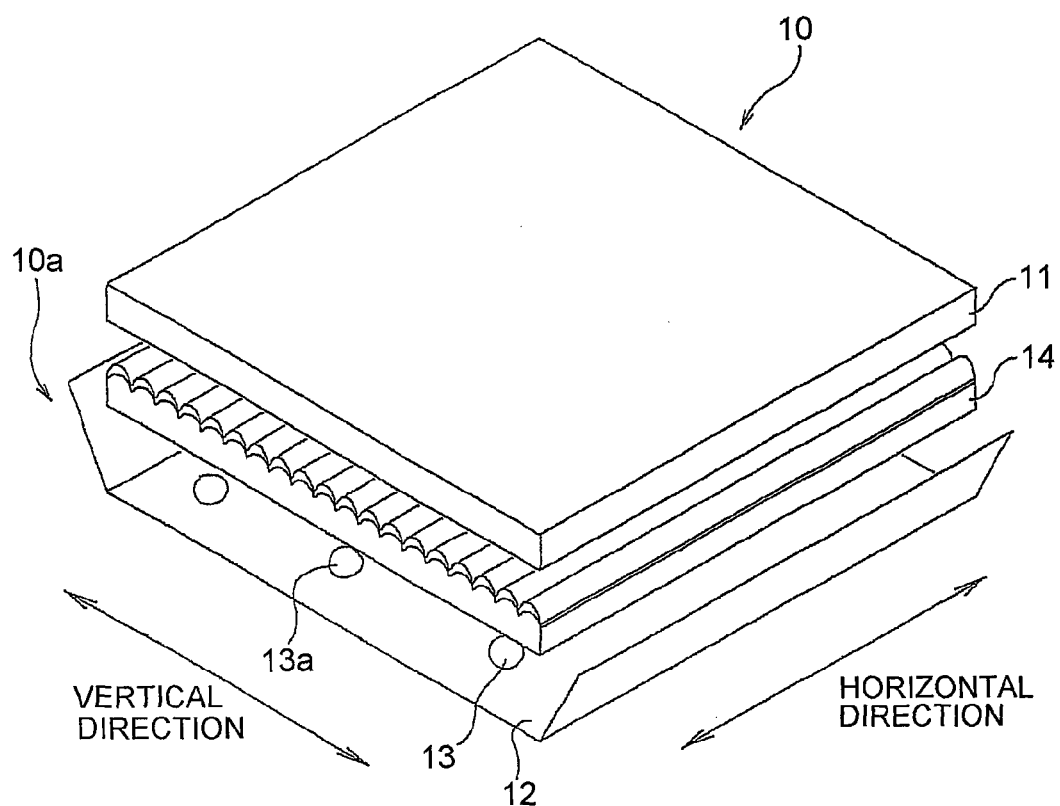
FIG. 19 is a diagram of one embodiment of the present invention showing a perspective view of a transmission display device and multiple point-like emission members.

In addition, in each embodiment, one example, in which the light source 13 includes the plurality of linear emission members (or linear emission tubes) 13a, has been discussed. The construction of the light source 13 is not limited to such an aspect. For example, the light source 13 may include a plurality of point-like emission members 13a, as shown in FIG. 19.

The invention claimed is:

1. A direct type surface light source device for illuminating a transmission display unit from a back side, the surface light source device comprising:
  a light source configured to emit illuminating light; and
  an optical sheet configured to allow light emitted from the light source to exit after changing a travel direction of the light, wherein the optical sheet includes:
    a light exiting side lens part including unit lenses juxtaposed to one another, each unit lens projecting toward a light exiting side,
  wherein a light scattering layer configured to scatter the light is provided to each unit lens,
  wherein the light scattering layer extends along a light exiting side surface of each projected unit lens and constitutes the light exiting side surface of the unit lens,
  wherein a thickness of the light scattering layer around an apex portion of each unit lens is greater than the thickness of the light scattering layer around each end portion of the unit lens,
  wherein the thickness of the light scattering layer around the apex portion of each unit lens is ⅓ or greater of an arrangement pitch of the unit lenses,
  wherein the light source includes emission members arranged with a space of a distance d, the optical sheet is located in a position spaced a distance s away from the emission members, and the following relation is satisfied:

$$L2 \times 1.2 \leq L1 \leq L2 \times 2.0,$$

in which L1 is a length of an optical path defined through the light scattering layer when light enters into the optical sheet from one of the emission members along the normal direction relative to the sheet surface of the optical sheet and then exits from the optical sheet along the normal direction relative to the sheet surface of the optical sheet, and L2 is a length of another optical path defined through the light scattering layer when the light enters into the optical sheet from the one of the emission members at an angle θ, wherein θ=arctan(d/s), and then exits from the optical sheet along the normal direction relative to the sheet surface of the optical sheet.

2. The surface light source device according to claim 1, wherein each unit lens has a shape corresponding to a part of an elliptic column having a section of an ellipse or has a shape corresponding to a part of a spheroid having a section of an ellipse, with a major axis of the sectional ellipse extending along a normal direction relative to a sheet surface.

3. The surface light source device according to claim 1, wherein the thickness of the light scattering layer is gradually reduced as one moves from the apex portion of each unit lens toward the end portion of the unit lens.

4. The surface light source device according to claim 1, wherein the light scattering layer is provided so as to constitute only a part of the light exiting side surface of each unit lens.

5. The surface light source device according to claim 1, wherein the light scattering layer is provided so as to constitute only a part of the light exiting side surface of each unit lens, and
wherein the thickness of the light scattering layer is gradually reduced as one moves away from the apex portion of the unit lens.

6. The surface light source device according to claim 1, wherein a direction of an optical path that is mainly controlled by the optical sheet is an up and down direction relative to a display surface of the transmission display part in use.

7. The surface light source device according to claim 1, wherein the optical sheet includes two optical sheets according to claim 1, and
wherein a direction of an optical path that is mainly controlled by one of the two optical sheets and a direction of an optical path that is mainly controlled by the other of the two optical sheets are perpendicular to each other.

8. The surface light source device according to claim 1, wherein the light source includes emission members each extending linearly in one direction, the emission members being arranged in a direction perpendicular to the one direction in which each emission member extends,
wherein each unit lens of the optical sheet extends while maintaining substantially the same sectional shape in a direction parallel to the sheet surface, and
wherein the direction in which each unit lens extends is parallel to the direction in which each linear emission member extends.

9. The surface light source device according to claim 1, wherein the light source includes point-like emission members arranged in two different directions.

10. The surface light source device according to claim 1, further comprising
a second optical sheet including a prism part having unit prisms juxtaposed to one another,
wherein each unit prism includes an apex point, in a section taken along an arrangement direction of the unit prisms.

11. The surface light source device according to claim 10, wherein the second optical sheet is located on the light exiting side relative to the optical sheet,
wherein each unit prism projects toward the light exiting side, and
wherein the arrangement direction of the unit prisms and an arrangement direction of the unit lenses are parallel to each other.

12. The surface light source device according to claim 10, wherein the second optical sheet is located on the light exiting side relative to the optical sheet,
wherein each unit prism projects toward the light exiting side, and
wherein the arrangement direction of the unit prisms and an arrangement direction of the unit lenses are perpendicular to each other.

13. The surface light source device according to claim 10, wherein the second optical sheet is located on the light exiting side relative to the optical sheet,
wherein each unit prism projects toward a side opposite to the light exiting side, and
wherein the arrangement direction of the unit prisms and an arrangement direction of the unit lenses are parallel to each other.

14. The surface light source device according to claim 10, wherein the second optical sheet is located on the light exiting side relative to the optical sheet,
wherein each unit prism projects toward a side opposite to the light exiting side, and
wherein the arrangement direction of the unit prisms and an arrangement direction of the unit lenses are perpendicular to each other.

15. The surface light source device according to claim 10, wherein the optical sheet is located on the light exiting side relative to the second optical sheet,
wherein each unit prism projects toward the light exiting side, and
wherein the arrangement direction of the unit prisms and an arrangement direction of the unit lenses are parallel to each other.

16. The surface light source device according to claim 10, wherein the optical sheet is located on the light exiting side relative to the second optical sheet,
wherein each unit prism projects toward the light exiting side, and
wherein the arrangement direction of the unit prisms and an arrangement direction of the unit lenses are perpendicular to each other.

17. The surface light source device according to claim 10, wherein the optical sheet is located on the light exiting side relative to the second optical sheet,
wherein each unit prism projects toward a side opposite to the light exiting side, and
wherein the arrangement direction of the unit prisms and an arrangement direction of the unit lenses are parallel to each other.

18. The surface light source device according to claim 10, wherein the optical sheet is located on the light exiting side relative to the second optical sheet,
wherein each unit prism projects toward a side opposite to the light exiting side, and
wherein the arrangement direction of the unit prisms and an arrangement direction of the unit lenses are perpendicular to each other.

19. The surface light source device according to claim 10, further comprising an adhesive layer located between the optical sheet and the second optical sheet.

20. The surface light source device according to claim 19, wherein at least one of the apex portion of each unit lens of the light exiting side lens part and an apex portion of each unit prism of the prism part is stuck into the adhesive layer, so that the optical sheet and the second optical sheet can be fixed in position via the adhesive layer.

21. The surface light source device according to claim 10, further comprising a polarized light separation film located on the light exiting side of the optical sheet and the second optical sheet.

22. A transmission display device comprising:
a transmission display unit; and
the surface light source device according to claim 1.

* * * * *